United States Patent
Ejima et al.

(10) Patent No.: US 7,907,747 B2
(45) Date of Patent: Mar. 15, 2011

(54) DEVICE, METHOD, AND RECORDING MEDIUM FOR EMBEDDING/DETECTING A DIGITAL WATERMARK

(75) Inventors: Masataka Ejima, Osaka (JP); Hisashi Inoue, Fukuoka (JP); Kenichi Noridomi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 958 days.

(21) Appl. No.: 11/791,838

(22) PCT Filed: Nov. 30, 2005

(86) PCT No.: PCT/JP2005/021999
§ 371 (c)(1),
(2), (4) Date: May 30, 2007

(87) PCT Pub. No.: WO2006/059648
PCT Pub. Date: Jun. 8, 2006

(65) Prior Publication Data
US 2008/0101650 A1    May 1, 2008

(30) Foreign Application Priority Data
Dec. 3, 2004  (JP) .................................. 2004-350905

(51) Int. Cl.
*G06K 9/00* (2006.01)
*H04L 9/32* (2006.01)
(52) U.S. Cl. ........................ 382/100; 713/176
(58) Field of Classification Search .................. 382/100, 382/232; 380/51, 54, 210, 252, 287; 713/176, 713/179; 358/3.28; 370/522–529; 283/72, 74–81, 85, 93
See application file for complete search history.

(56) References Cited

U.S. PATENT DOCUMENTS

| | | | | |
|---|---|---|---|---|
| 6,580,804 | B1 * | 6/2003 | Abe | 382/100 |
| 7,433,489 | B2 * | 10/2008 | Wendt | 382/100 |
| 7,720,249 | B2 * | 5/2010 | Rhoads | 382/100 |

FOREIGN PATENT DOCUMENTS

| | | |
|---|---|---|
| JP | 2000-350001 | 12/2000 |
| JP | 2001-285619 | 10/2001 |
| JP | 2002-111994 | 4/2002 |
| JP | 2004-147253 | 5/2004 |

\* cited by examiner

*Primary Examiner* — Abolfazl Tabatabai
(74) *Attorney, Agent, or Firm* — Wenderoth, Lind & Ponack, L.L.P.

(57) ABSTRACT

Even in the case where a positional misalignment occurs to an embedded digital watermark, watermark information is accurately detected. A digital watermark embedding device includes a block dividing section for dividing digital data into a plurality of blocks each having a predetermined size, and a block selecting section for selecting m blocks (m is an integer no less than 2) from the plurality of the blocks in accordance with a predetermined order. The device further includes an additional pattern setting section for setting a combination of m additional patterns which are selected from a plurality types of additional patterns, the combination corresponding to one data element to be embedded into the selected m blocks, and an additional pattern embedding section for embedding each of the set additional patterns into each of the selected blocks.

11 Claims, 18 Drawing Sheets

FIG. 18

| 1 | 1 | 1 | 1 | -1 | -1 | -1 | -1 |
|---|---|---|---|----|----|----|----|
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |

FIG. 19

| 1.0 | 0.8 | 0.5 | 0.2 | -0.2 | -0.5 | -0.8 | -1.0 |
|-----|-----|-----|-----|------|------|------|------|
| 0.8 | 0.7 | 0.5 | 0.2 | -0.2 | -0.5 | -0.7 | -0.8 |
| 0.5 | 0.5 | 0.3 | 0.1 | -0.1 | -0.3 | -0.5 | -0.5 |
| 0.2 | 0.2 | 0.1 | 0.0 | 0.0 | -0.1 | -0.2 | -0.2 |
| -0.2 | -0.2 | -0.1 | 0.0 | 0.0 | 0.1 | 0.2 | 0.2 |
| -0.5 | -0.5 | -0.3 | -0.1 | 0.1 | 0.3 | 0.5 | 0.5 |
| -0.8 | -0.7 | -0.5 | -0.2 | 0.2 | 0.5 | 0.7 | 0.8 |
| -1.0 | -0.8 | -0.5 | -0.2 | 0.2 | 0.5 | 0.8 | 1.0 |

DEVICE, METHOD, AND RECORDING MEDIUM FOR EMBEDDING/DETECTING A DIGITAL WATERMARK

TECHNICAL FIELD

The present invention relates to devices, methods, and recording mediums for embedding/detecting a digital watermark, and more specifically relates to devices, methods, and recording mediums for embedding/detecting a digital watermark, which improve detection rate of the digital watermark.

BACKGROUND ART

With the spread of digital equipment, a copy of a digital content (hereinafter referred to as a "content") can be created easily. As a result, illegal copying which ignores a copyright is increasing, and thus protection of the copyright is becoming an important issue.

As one of solutions to the protection of the copyright, a "digital watermark" is being considered. The "digital watermark" is a technique of embedding information relating to the copyright and the like in a secret manner which cannot be perceived by humans.

Normally, various processing is applied to the content. For example, a storage media has a limitation in capacity thereof, and thus, irreversible compression of the content is performed so as to reduce capacity required for storage thereof. Further, it is assumed that processing such as format conversion and filtering is applied to the content in order to delete intentionally the information which is embedded as the digital watermark into the content.

Therefore, the digital watermark requires robustness against various types of processing as above described.

As a conventional technique to improve the tolerance of the digital watermark, for example, a technique that improves the robustness against scale-up/scale-down processing is known (e.g. see patent document 1).

FIG. 26 is a block diagram showing a conventional technique for embedding and detecting a digital watermark as described in patent document 1.

First, a conventional digital watermark embedding device embeds embedding data into an original image in accordance with equation 1 as follows.

$$i(x,y)=i_s(x,y)+p(x,y) \quad \text{[Equation 1]}$$

In equation 1, (x,y) indicates coordinates of a pixel, $i_s(x,y)$ indicates a pixel value of the original image at the coordinates (x,y), p(x,y) indicates a pattern to be added, for embedding information, to the original image at the coordinates (x,y), and i(x,y) indicates a pixel value of a watermarked image into which the information is embedded at the coordinates (x,y).

Here, p(x,y) further satisfies a condition of equation 2 as follows.

$$p(x+l,y)=p(x,y) \quad \text{[Equation 2]}$$

Note that h indicates a cycle period of the pattern.

As above described, there is a case where a scale-up or scale-down processing is applied to an embedded image obtained by embedding information to the original image. Hereinafter, a target image with respect to which a conventional digital watermark detecting device executes detection of the digital watermark is referred to as a "processing target image".

Before detecting the digital watermark included in the processing target image, the digital watermark detecting device obtains a scale-up or scale-down ratio of the processing target image in accordance with an autocorrelation defined in equation 3. Next, based on the obtained scale-up or scale-down ratio, the digital watermark detecting device restores the embedded image by scaling up or scaling down the processing target image, and then detects watermark information.

$$Co = \frac{\sum_x \sum_y p'(x,y)p'(x+o,y)}{\sqrt{\sum_x \sum_y p'(x,y)^2}\sqrt{\sum_x \sum_y p'(x+o,y)^2}} \quad \text{[Equation 3]}$$

Here, p' (x, y) indicates an embedded pattern element extracted from a detecting image i'(x,y).

When the scale-up/scale-down ratio is represented by ρ, the autocorrelation Co has a peak at o which satisfies equation 4 as follows.

$$\rho=o/h \quad \text{[Equation 4]}$$

By searching the peak of the autocorrelation Co, the scale-up/scale-down ratio of the processing target image with respect to the embedded image can be obtained.

FIG. 27A is a schematic diagram showing a conventional scale-up/scale-down processing, and more specifically, is a diagram showing a case where the autocorrelation does not have the peak since o does not satisfy equation 4. FIG. 27B is a schematic diagram showing the conventional scale-up/scale-down processing, and more specifically, is a diagram showing a case where the autocorrelation has the peak since o satisfies equation 4.

Patent Document 1: Japanese Laid-Open Patent Publication No. 2002-111994

SUMMARY OF THE INVENTION

Problems to be Solved by the Invention

Among the content having a digital watermark embedded therein, for example, images are not only used as digital data but also used by printing on paper. Further, there is a case where not only a scale-up/scale-down processing, but also clipping, for example, is applied to image data. Therefore, it is desirable that information to be embedded as the digital watermark is detectable even from the image data which is obtained by optically converting an image printed on the paper to digital data, or the image data to which clipping is applied.

However, in the image data optically converted from the printed image or the image data to which clipping is applied, there is a case where a position of the digital watermark embedded therein is misaligned with a position of the digital watermark initially embedded into an original image. Therefore, there has been a problem in that information embedded as the digital watermark into such images cannot be accurately detected only by using the conventional technique directed to the scale-up/scale-down processing.

Therefore, the present invention is made to solve the conventional problem, and designed to provide a digital watermark embedding device and a detecting device, a digital watermark embedding method and a detecting method, and a computer-readable recording medium having digital watermark embedding and detecting programs recorded thereon, all of which enable accurate detection of the information embedded as the digital watermark from the image data optically converted from the printed image or the image data to which clipping is applied.

Solution to the Problems

A first aspect of the present invention is directed to a digital watermark embedding device for embedding information including at least one data element into digital data as a digital watermark. The digital watermark embedding device comprising: a block dividing section for dividing the digital data into a plurality of blocks each having a predetermined size; a block selecting section for selecting m blocks (m is an integer no less than 2) from the plurality of the blocks in accordance with a predetermined order; an additional pattern setting section for setting a combination of m additional patterns selected from a plurality of types of the additional patterns, the combination corresponding to one data element to be embedded into the selected m blocks; and an additional pattern embedding section for embedding each of the set additional patterns into each of the selected blocks.

In this case, it is preferable that the additional pattern setting section sets, depending on the additional pattern to be embedded into one of the selected blocks, the additional pattern to be embedded into another one of the selected blocks.

Further, the digital data may include a plurality of pixel values, the additional pattern may be an array of data to be embedded into each of the pixel values, and the additional pattern setting section may set a combination of two types of the additional patterns which are reversed from each other, in terms of a relative magnitude relation of data contained in each of the additional patterns.

A second aspect is directed to a digital watermark detecting device for detecting information embedded in digital data as a digital watermark. The digital watermark detecting device comprising: a block dividing section for dividing the digital data into a plurality of blocks each having a predetermined size; a block selecting section for selecting m blocks (m is an integer no less than 2) from the plurality of the blocks, in accordance with a predetermined order; and an embedded information determining section for detecting a combination of m additional patterns embedded in the selected blocks, and determining a data element corresponding to the combination of the additional patterns.

In this case, it is preferable that the embedded information determining section calculates a cross-correlation between a predetermined detection filter and each of the selected blocks, and detects the combination of the additional patterns.

Further, the detection filter may be constituted of at least a part of one of the additional patterns in accordance with a phase change in the calculated cross-correlation.

A third aspect is directed to a digital watermark embedding method for embedding information including at least one data element into digital data as a digital watermark. The digital watermark embedding method comprising: a block dividing step of dividing the digital data into a plurality of blocks each having a predetermined size; a block selecting step of selecting m blocks (m is an integer no less than 2) from the plurality of the blocks in accordance with a predetermined order, an additional pattern setting step of setting a combination of m additional patterns selected from a plurality of types of additional patterns, the combination corresponding to one data element to be embedded into the selected m blocks; and an additional pattern embedding step of embedding each of the set additional patterns into each of the selected blocks.

A fourth aspect is directed to a digital watermark detecting method for detecting information embedded in digital data as a digital watermark. The digital watermark detecting method comprising: a block dividing step of dividing the digital data into a plurality of blocks each having a predetermined size; a block selecting step of selecting m blocks (m is an integer no less than 2) from the plurality of the blocks in accordance with a predetermined order; and an embedded information determining step of detecting a combination of m additional patterns which are embedded in the selected blocks, and determining a data element corresponding to the combination of the additional patterns.

A fifth aspect is directed to a computer readable recording medium storing thereon a program for embedding information including at least one data element into digital data as a digital watermark. In the storing medium, the program is recorded, in a computer readable manner, so as to cause the computer to perform: a block dividing function of dividing the digital data into a plurality of blocks each having a predetermined size; a block selecting function of selecting, from the plurality of the blocks, m blocks (m is an integer no less than 2) in accordance with a predetermined order; an additional pattern setting function of setting a combination of m additional patterns selected from a plurality types of additional patterns, the combination corresponding to one data element to be embedded into the selected m blocks; and an additional pattern embedding function of embedding each of the set additional patterns into each of the selected blocks.

A sixth aspect is directed to a computer readable recording medium storing thereon a program for detecting information embedded in digital data as a digital watermark. In the recording medium, the program is recorded, in a computer readable manner, so as to cause the computer to perform: a block dividing function of dividing the digital data into a plurality of blocks each having a predetermined size; a block selecting function of selecting m blocks (m is an integer no less than 2) from the plurality of the blocks, in accordance with a predetermined order; and an embedded information determining function of detecting a combination of m additional patterns which are embedded in the selected blocks, and determining a data element corresponding to the combination of the additional patterns.

EFFECT OF THE INVENTION

According to the present invention, an embedded information signal is determined by calculating a cross-correlation between a predetermined detection filter and a selected block, and then obtaining a combination of additional patterns in accordance with a phase change of the cross-correlation. Even in the case where a positional misalignment occurs, the phase change of the cross-correlation is invariant, and thus the embedded information signal can be detected accurately.

BRIEF DESCRIPTION OF THE DRAWINGS

FIG. 18 is a diagram showing an example of Walsh-Hadamard basis.

FIG. 19 is a diagram showing an example of DCT (Discrete Cosine Transform) basis.

Figure 1:
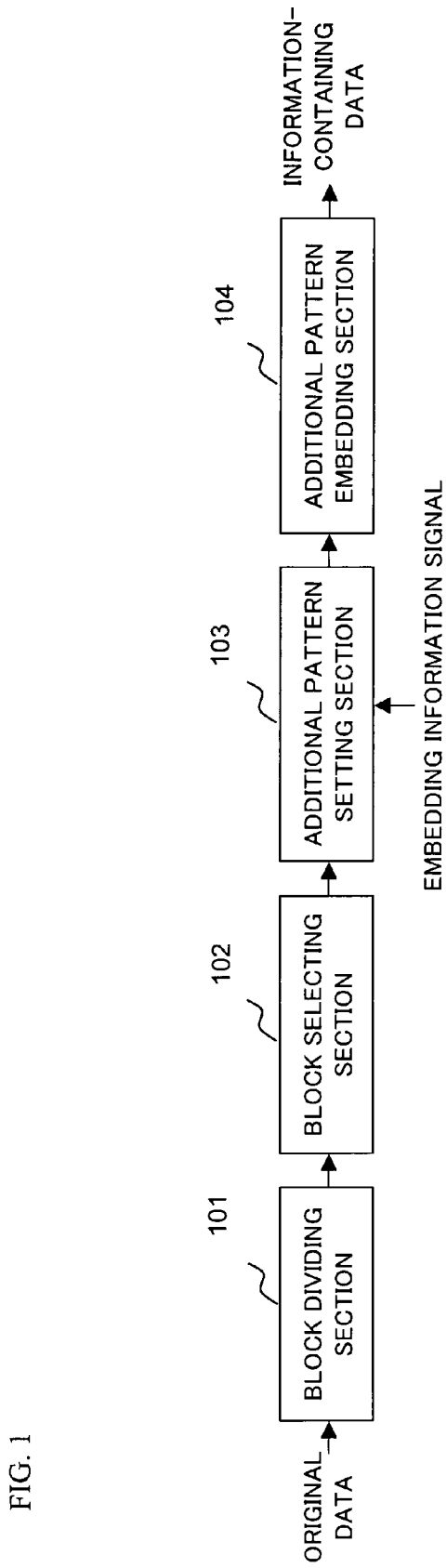
FIG. 1 is a block diagram of a digital watermark embedding device according to embodiment 1 of the present invention.

DESCRIPTION OF THE REFERENCE CHARACTERS 101 block dividing section
102 block selecting section
103 additional pattern setting section
104 additional pattern embedding section
701 block dividing section
702 block selecting section
703 embedded information determining section
2401 CPU
2402 image capturing section
2403, 2405, 2408, 2411 I/O
2404 display section
2406 RAM
2407 external storage device
2409 recording medium
2410 drive
2412 network I/F

DETAILED DESCRIPTION OF THE INVENTION

Hereinafter, with reference to drawings, embodiments of the present invention will be described. Note that, in description hereinafter, data into which a digital watermark embedding device embeds an embedding information signal is referred to as "original data", and data having the embedding information signal embedded therein is referred to as "information-containing data".

Embodiment 1

FIG. 1 is a block diagram of a digital watermark embedding device according to embodiment 1 of the present invention. The digital watermark embedding device shown in FIG. 1 comprises a block dividing section 101, a block selecting section 102, an additional pattern setting section 103, and an additional pattern embedding section 104.

Figure 2:
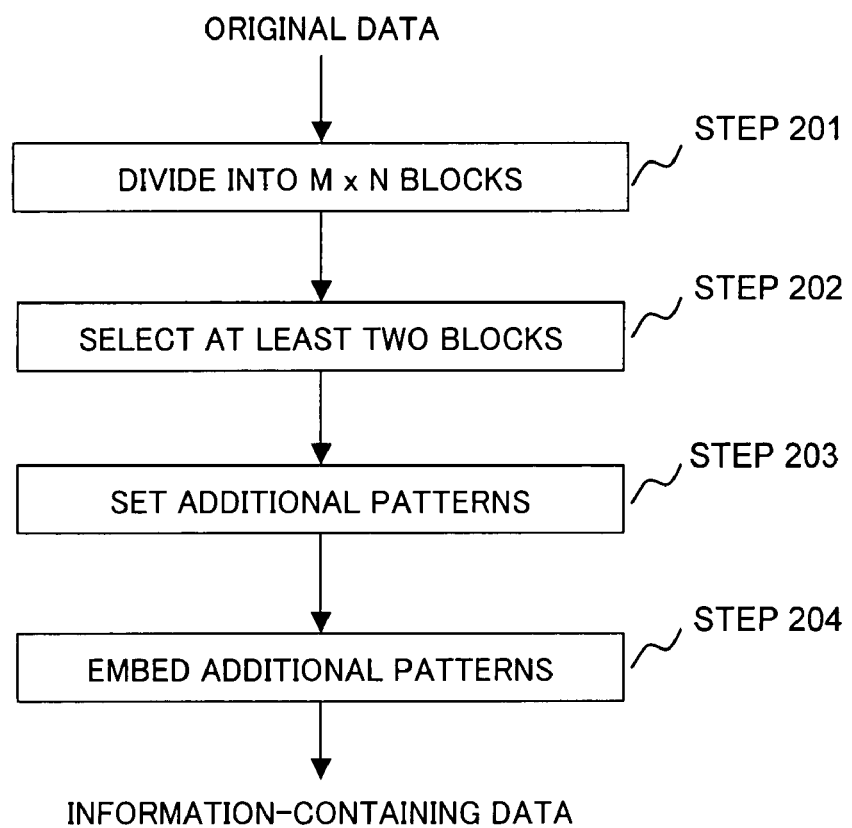
FIG. 2 is a flowchart showing a digital watermark embedding method executed by the digital watermark embedding device according to embodiment 1 of the present invention.

FIG. 2 is a flowchart showing a digital watermark embedding method executed by the digital watermark embedding device according to embodiment 1 of the present invention.

First, the original data (a still image) is inputted to the digital watermark embedding device. The block dividing section 101 divides the original data into a plurality of blocks respectively containing M×N pixels (step 201). M and N are respectively integers no less than 1, and M×N is an integer no less than 2.

Next, the block selecting section 102 selects, in accordance with a predetermined order, at least 2 blocks from the plurality of the blocks divided by the block dividing section 101 (step 202).

Next, in accordance with the predetermined embedding information signal, the additional pattern setting section 103 sets a combination of additional patterns to be embedded into the blocks selected by the block selecting section 102 (step 203).

And, the additional pattern embedding section 104 embeds each of the additional patterns set by the additional pattern setting section 103 into each of the blocks selected by the block selecting section 102 (step 204).

Hereinafter, in the context of a specific example, a further detail of each of the above-described steps will be described.

Figure 21A:
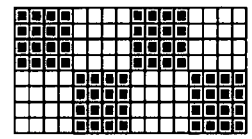
FIG. 21A is a diagram showing example 2 of the additional pattern.
Figure 21B:
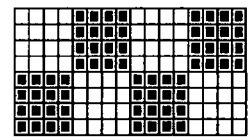
FIG. 21B is a diagram showing example 2 of the additional pattern.
Figure 22A:
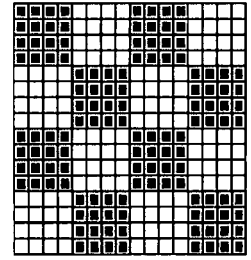
FIG. 22A is a diagram showing example 3 of the additional pattern.
Figure 22B:
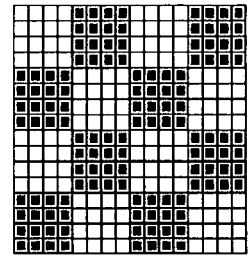
FIG. 22B is a diagram showing example 3 of the additional pattern.

Here, the additional patterns will be described. The digital watermark embedding device uses two types of the additional patterns as shown in FIGS. 21A and 21B. Each of the additional patterns shown in FIGS. 21A and 21B has data arranged in a array of 16×8, which is to be embedded into respective pixel values included in each block.

For the sake of a simple description, it will be assumed that each of the additional patterns shown in FIGS. 21A and 21B is formed by an array comprising two types of data which correspond to data shown in white and data shown in grey in the drawings. A magnitude relation between the data shown in white and the data shown in grey is predetermined. Further, in terms of the magnitude relation of the data, each of the data included in the additional pattern shown in FIG. 21A is located in a reversed manner with respect to each of the data included in the additional pattern shown in FIG. 21B.

Further, when two of the additional patterns are compared to each other, the two additional patterns are "in phase" in the case of being identical to each other. Further, when two of the additional patterns are compared to each other, for example, as with a relation between the additional pattern of FIG. 21A and the additional pattern of FIG. 21B, the two additional patterns are "in opposite phase" in the case of being in a reversed relation with respect to each other.

Further, in embodiment 1, the digital watermark embedding device embeds the combination of the additional patterns, which is set so as to be in phase with each other, into the blocks when a value of the embedding information signal W[k] (k indicating an index of an embedding information bit) is 0, and embeds the combination of the additional patterns, which is set so as to be in opposite phase to each other, into the blocks when the value of the embedding information signal W[k] is 1. Note that the embedding information signal to be embedded as the digital watermark is constituted of an array having at least one embedding information W[k]. One embedding information signal W[k] corresponds to one data element constituting information to be embedded. Note that, in embodiment 1, the one data element of the embedding information signal corresponds to 1 bit information (0 or 1), but may correspond to information which can be expressed by no less than 2 bits.

Figure 3:
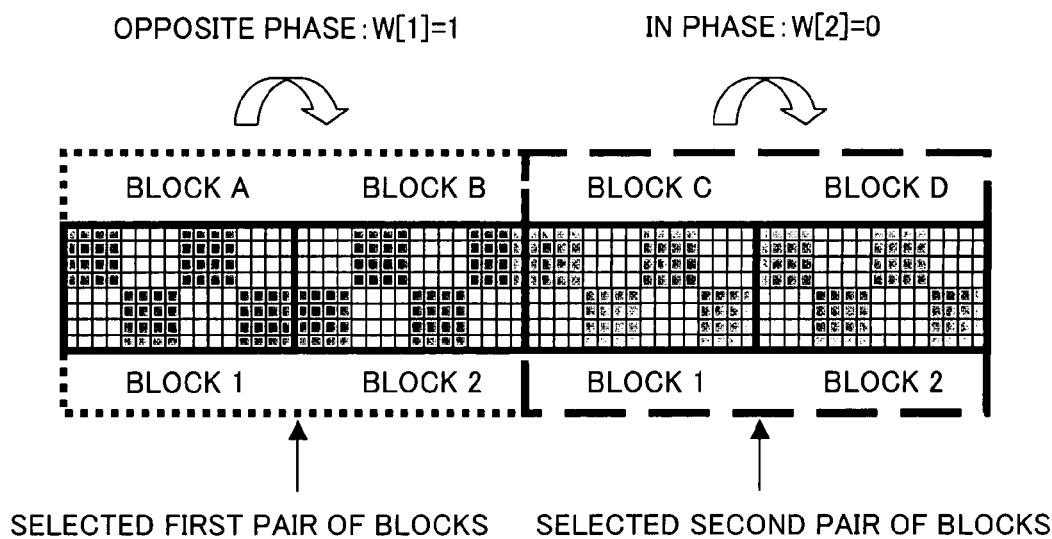
FIG. 3 is a diagram showing an example of the digital watermark embedding method (embedding without duplication) according to embodiment 1 of the present invention.

FIG. 3 is a diagram showing an example of the digital watermark embedding method according to embodiment 1 of the present invention. In the example shown in FIG. 3, it is assumed that 2-bit embedding information signals W[1]=1, W[2]=0 are embedded as the embedding information signal W[k] (k indicating an index of the embedding information bit) into the original data of 64×8 pixels.

First, the block dividing section 101 divides the original data containing 64×8 pixels into 4 blocks respectively containing 16×8 pixels (step 201). For the sake of a simple description, the divided blocks are referred to as blocks A to D in sequence.

Next, the block selecting section 102 selects two blocks 1 and 2 from blocks A to D in order proceeding from left to right in FIG. 3 (step 202). As a block selecting method, there is a method of selecting blocks without reselecting a block already selected (hereinafter referred to as a method "without duplication"), and a method of reselecting the block which is already selected (hereinafter referred to as a method "with duplication"). FIG. 3 shows an example of the digital watermark embedding device embedding information in accordance with the method without duplication. Blocks A and B are selected as a first pair of blocks 1 and 2, and blocks C and D are selected as a second pair of blocks 1 and 2.

Next, the additional pattern setting section 103 sets the combination of additional patterns which are to be embedded into blocks 1 and 2 selected in step 202 (step 203). In accordance with a value 1 of the embedding information signal W[1] to be embedded into the selected first pair of blocks A and B, the additional pattern setting section 103 sets a combination of the additional patterns, which are in opposite phase to each other, to blocks A and B. Further, in accordance with a value 0 of the embedding information signal W[2] to be embedded into the selected second pair of blocks C and D, the additional pattern setting section 103 sets a combination of the additional patterns, which are in phase with each other, to blocks C and D. Therefore, the additional pattern of FIG. 21A is set to block A, the additional pattern of FIG. 21B is set to block B, the additional pattern of FIG. 21A is set to block C, and the additional pattern of FIG. 21A is set to block D.

Further, the additional pattern embedding section 104 embeds each of the set additional patterns into each of blocks A to D (step 204). More specifically, the additional pattern embedding section 104 embeds each of the data contained in the additional patterns set in step 203 into each of the pixel values contained in the blocks, thereby obtaining information-containing image data.

Figure 4:
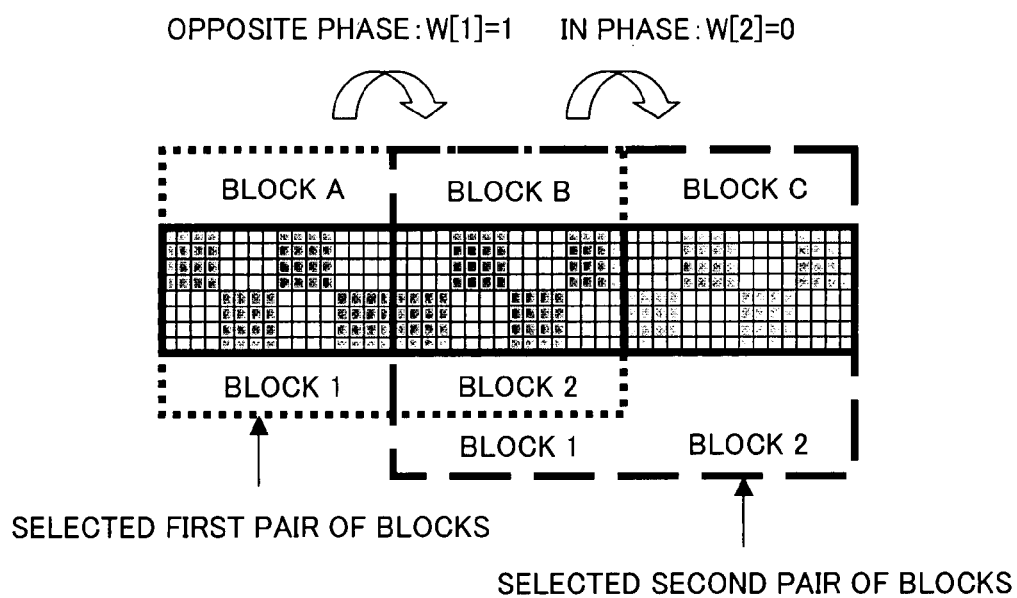
FIG. 4 is a diagram showing another example of the digital watermark embedding method (embedding with duplication) according to embodiment 1 of the present invention.

FIG. 4 is a diagram showing another example of the digital watermark embedding method according to embodiment 1 of the present invention. FIG. 4 shows an example of the digital watermark embedding device embedding the information in accordance with the method with duplication. In an example below, it is assumed that 2-bit embedding information signals W[1]=1, W[2]=0 are embedded as the embedding information signals W[k] (k indicating an index of the embedding information bit) into the original data of 48×8 pixels.

First, the block dividing section 101 divides the original data containing 48×8 pixels into 3 blocks respectively containing 16×8 pixels (step 201). For the sake of a simple description, the divided blocks are referred to as blocks A to C in sequence.

Next, the block selecting section 102 selects, from blocks A to C, two blocks in order proceeding from left to right in FIG. 4 (step 202). The block selecting section 102 selects blocks A and B as a first pair of blocks 1 and 2. Further, the block selecting section 102 selects blocks B and C as a second pair of blocks 1 and 2 by selecting the block B which is already selected for the first pair.

Next, the additional pattern setting section 103 sets a combination of additional patterns to be embedded into the blocks 1 and 2 selected in step 202 (step 203). In accordance with a value 1 of the embedding information signal W[1] to be embedded into the first pair of blocks, the additional pattern setting section 103 sets the additional pattern of FIG. 21A to block A, and sets the additional pattern of FIG. 21B to block B.

When the additional pattern setting section 103 sets the additional patterns to the first pair of blocks 1 and 2, respectively, the additional pattern to be embedded into block 1 of the second pair (block 2 of the first pair, that is, block B) is already determined. Therefore, depending on the additional pattern for the already determined block 1 (block B), only the additional pattern for block 2 (block C) needs to be determined. With respect to blocks B and C of the second pair, in accordance with a value 0 of the embedding information signal W[2] to be embedded thereinto, a combination of additional patterns, which are in phase with each other, is set. Therefore, the additional pattern setting section 103 sets the additional pattern shown in FIG. 21B to block C.

After that, the additional pattern embedding section 104 embeds respective data contained in the additional patterns set in step 203 into respective pixel values contained in blocks A to C, and thereby obtaining information-containing image data.

As above described, in the digital watermark embedding device and the method according to embodiment 1, the combination of the two additional patterns are set corresponding to the value W[k], which indicates one data element constituting the embedding information signal, and each of the set additional patterns are embedded into each of the two blocks. A relative relation of each of the additional patterns embedded in a neighboring pair of blocks is less subject to a change caused by a positional misalignment of the image data, whereby a tolerance of the digital watermark against the positional misalignment can be improved.

Specifically, in the case where the digital watermark embedding device embeds the embedding information signals in accordance with the method with duplication, a number of the embedding information signals which are to be embedded into a fixed number of blocks can be increased. Therefore, a larger amount of information can be embedded into digital data compared to the method without duplication.

Embodiment 2

Since a constitution of a digital watermark embedding device according to embodiment 2 is the same as that according to embodiment 1, the block diagram, the flowchart, and description thereof as shown in embodiment 1 apply to the present embodiment. Thus, description thereof is omitted here.

Hereinafter, in the context of a specific example, details of the respective steps will be described.

Figure 5:
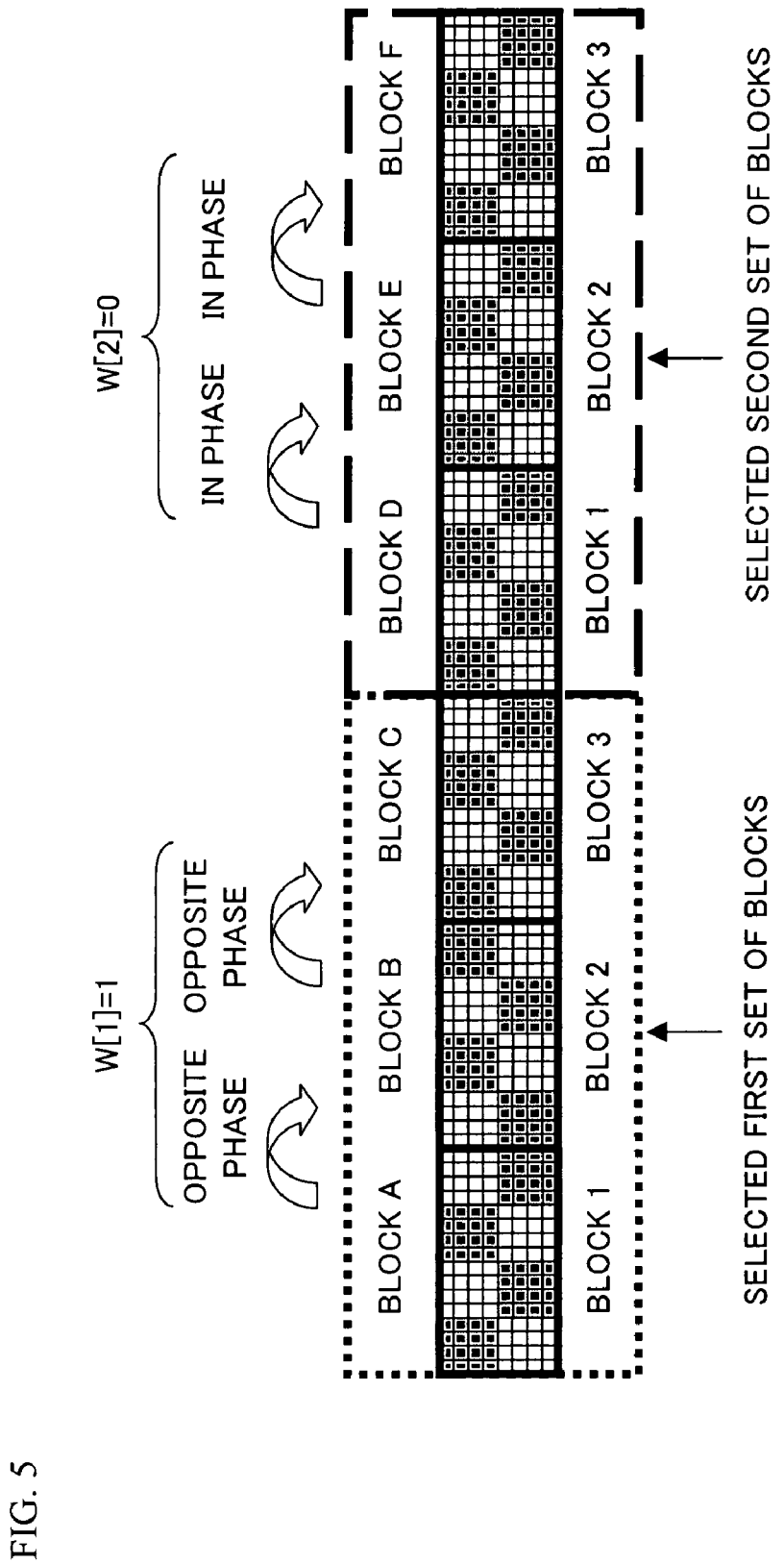
FIG. 5 is a diagram showing an example of a digital watermark embedding method (embedding without duplication) according to embodiment 2 of the present invention.

FIG. 5 is a diagram showing an example of a digital watermark embedding method according to embodiment 2 of the present invention. In the example shown in FIG. 5, it is assumed that 2-bit embedding information signals W[1]=1, W[2]=0 are embedded, as the embedding information signal W[k] (k indicating an index of an embedding information bit), into the original data containing 96×8 pixels.

First, a block dividing section 101 divides the original data containing 96×8 pixels into 6 blocks respectively containing 16×8 pixels (step 201). For the sake of a simple description, the divided blocks are referred to as blocks A to F in sequence.

Next, a block selecting section 102 selects three blocks 1 to 3 from blocks A to F, in order proceeding from left to right in FIG. 3 (step 202). As a block selecting method, there are a method of selecting blocks without reselecting blocks already selected (hereinafter referred to as a method "without duplication"), and a method of reselecting blocks already selected (hereinafter referred to as a method "with duplication"). FIG. 5 shows an example of the digital watermark embedding device embedding information in accordance with the method without duplication. Blocks A to C are selected as a first set of blocks 1 to 3, and blocks D to F are selected as a second set of blocks 1 to 3.

Next, an additional pattern setting section 103 set a combination of additional patterns to be embedded into blocks 1 to 3 selected in step 202 (step 203). In embodiment 2, in the case where a value of the embedding information signal W[k] is 0, the digital watermark embedding device sets, to block 2, an additional pattern which is in phase with an additional pattern set to block 1, and also sets, to block 3, an additional pattern which is in phase with the additional pattern set to block 2. On the other hand, in the case where the value of the embedding information signal W[k] is 1, the digital watermark embedding device sets, to block 2, an additional pattern which is in opposite phase to an additional pattern set to block 1, and also sets, to block 3, an additional pattern which is in opposite phase to the additional pattern set to block 2.

Specifically, in accordance with the value 1 of information W[0] to be embedded into blocks A to C, the additional pattern setting section 103 sets the additional pattern of FIG. 21A to block A, and sets the additional pattern of FIG. 21B to block B, and the additional pattern of FIG. 21A to block C. Further, in accordance with the value 0 of the information W[k] embedded in blocks D to F, the additional pattern setting section 103 sets the additional pattern of FIG. A to each of blocks D to F.

And then, an additional pattern embedding section 104 embeds each of the set additional patterns into each of the selected blocks (step 204). More specifically, the additional pattern embedding section 104 embeds respective data contained in the additional patterns set in step 203 into respective pixel values contained in the blocks, thereby obtaining information-containing image data.

Figure 6:
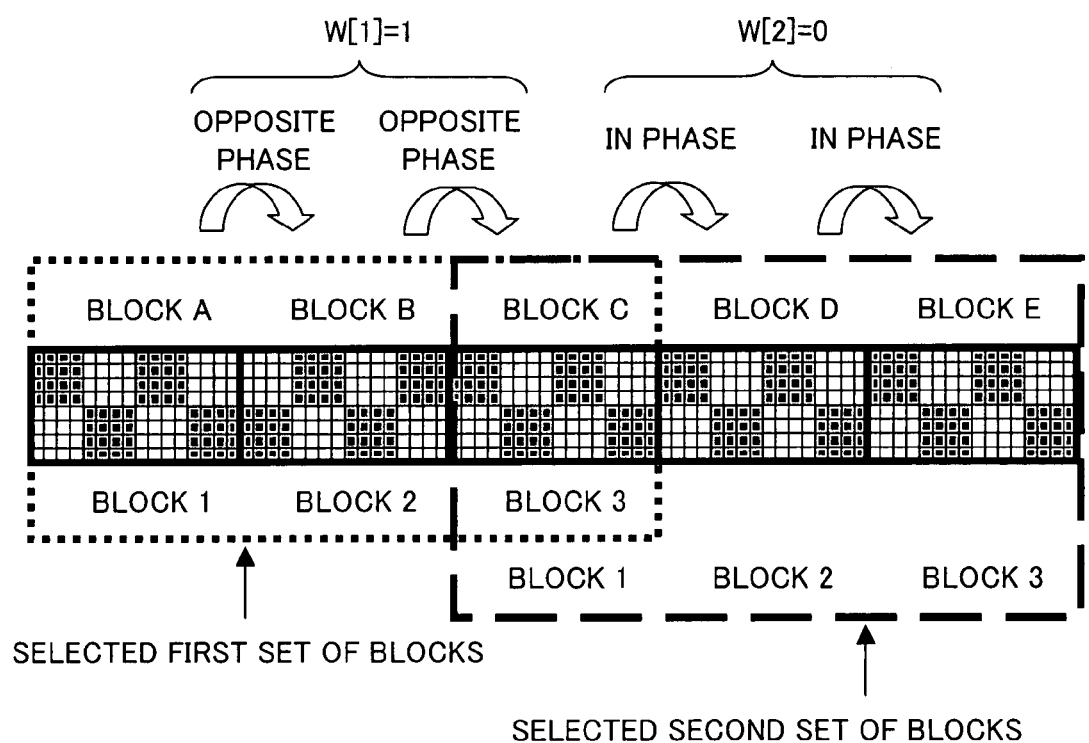
FIG. 6 is a diagram showing another example of the digital watermark embedding method (embedding with duplication) according to embodiment 2 of the present invention.

FIG. 6 is a diagram showing another example of the digital watermark embedding method according to embodiment 2 of the present invention. FIG. 6 shows an example of the digital watermark embedding device embedding information in accordance with the method with duplication. In an example below, it is assumed that 2-bit embedding information signals W[1]=1, W[2]=0 are embedded, as the embedding information signal W[k] (k indicating an index of an embedding information bit), into the original data containing 80×8 pixels.

First, the block dividing section 101 divides the original data containing 80×8 pixels into five blocks respectively containing 16×8 pixels (step 201). For the sake of a simple description, the divided blocks are referred to as blocks A to E in sequence.

Next, the block selecting section 102 selects three blocks each time from blocks A to E, in order proceeding from left to right in FIG. 6 (step 202). The block selecting section 102 selects blocks A to C as a first set of blocks 1 to 3, and selects blocks C to E as a second set of blocks 1 to 3.

Next, the additional pattern setting section 103 sets a combination of additional patterns to be embedded into each of the sets of blocks 1 to 3 selected in step 202 (step 203). In accordance with a value 1 of the embedding information signal W[1] to be embedded into the first set of blocks, the additional pattern setting section 103 sets the additional pattern of FIG. 21A to block A, sets the additional pattern of FIG. 21B to block B and sets the additional pattern of FIG. 21A to block B.

When the additional pattern setting section 103 sets the additional pattern to each of the first set of blocks, an additional pattern to be embedded into block 1 of the second set (block 3 of the first set, that is, block C) is already determined. Therefore, the additional pattern setting section 103 needs to determine only additional patterns for blocks 2 and 3 (blocks D and E) depending on the additional pattern already determined for block 1 (block C). To blocks D and E of the second set, in accordance with a value 0 of the embedding information signal W[2] to be embedded, a combination of additional patterns which are in phase with each other is set. Therefore, the additional pattern setting section 103 sets the additional patterns shown in FIG. 21A to each of blocks D and E.

After that, the additional pattern embedding section 104 embeds respective data contained in the additional patterns set in step 203 into respective pixel values contained in the blocks, thereby obtaining information-containing data.

As above described, in the digital watermark embedding device and the method according to embodiment 2, the combination of three additional patterns are set corresponding to the value of W[k], which indicates one data element constituting the embedding information signal, and then each of the set additional patterns are embedded into each of the three blocks. A relative relation of each of the additional patterns embedded in a neighboring pair of blocks is less subject to a change caused by a positional misalignment of image data, whereby a tolerance of the digital watermark against the positional misalignment can be improved.

Further, in embodiment 2 as well, in the case where the digital watermark embedding device embeds information in accordance with the method with duplication, a larger amount of information can be embedded into digital data, compared to the case where information is embedded in accordance with the method without duplication.

Embodiment 3

Figure 7:
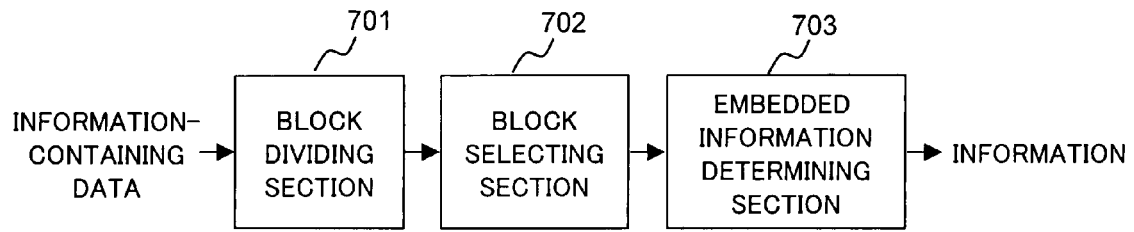
FIG. 7 is a block diagram of a digital watermark detecting device according to embodiment 3 of the present invention.

FIG. 7 is a block diagram of a digital watermark detecting device according to embodiment 3 of the present invention. The digital watermark detecting device shown in FIG. 7 comprises a block dividing section 701, a block selecting section 702, and an embedded information determining section 703.

Figure 8:
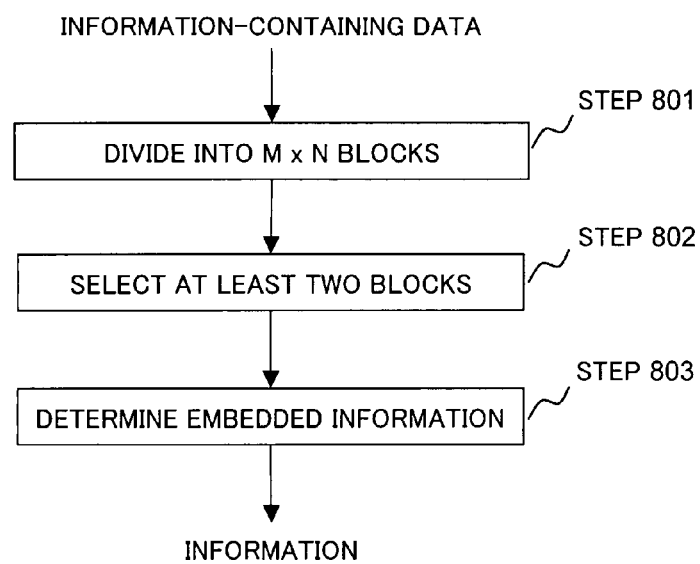
FIG. 8 is a flowchart showing a digital watermark detecting method executed by the digital watermark detecting device according to embodiment 3 of the present invention.

FIG. 8 is a flowchart showing a digital watermark detecting method executed by the digital watermark detecting device according to embodiment 3 of the present invention.

First, information-containing data is inputted to the digital watermark detecting device. The block dividing section 701 divides the information-containing data into a plurality of blocks respectively containing M×N pixels (step 801). Note that M and N are respectively integers no less than 1, and M×N is an integer no less than 2.

Next, the block selecting section 702 selects, from the plurality of the blocks divided by the block dividing section 701, at least two blocks in accordance with a predetermined order (step 802).

And, the embedded information determining section 703 extracts a combination of additional patterns which are embedded in the blocks selected by the block selecting section 702, and determines embedded information corresponding to the combination of the additional patterns (step 803).

Hereinafter, details of each of the steps will be described. In embodiment 3, it is assumed that 0 is embedded as information when two additional patterns are in phase with each other, and that 1 is embedded as information when the two additional patters are in opposite phase to each other.

Figure 9:
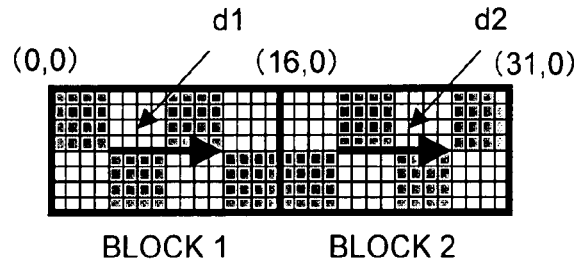
FIG. 9 is a diagram showing an example of a detecting method (a case without a positional misalignment in additional patterns) executed by the digital watermark detecting device according to embodiment 3 of the present invention.

FIG. 9 is a diagram showing an example of a detecting method executed by the digital watermark detecting device according to embodiment 3 of the present invention. FIG. 9 shows a case where there is no positional misalignment occurring to the additional patterns embedded in the information-containing data.

First, the block dividing section 701 divides the information-containing data containing 32×8 pixels into two block units respectively including 16×8 pixels (step 801).

Next, the block selecting section 702 selects blocks 1 and 2 from the two blocks divided by the block dividing section 701 (step 802).

Finally, the embedded information determining section 703 detects the combination of the additional patterns embedded in blocks 1 and 2, and then determines the embedded information corresponding to the detected additional patterns.

Figure 13:
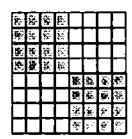
FIG. 13 is a diagram showing a detection filter to be used by the digital watermark detecting devices according to embodiments 3 and 4 of the present invention.

More specifically, the embedded information determining section 703 uses a pattern shown in FIG. 13 as a detection filter. In embodiment 3, the detection filter is a part of the additional pattern shown in FIG. 21A. The embedded information determining section 703 calculates a cross-correlation between the detection filter shown in FIG. 13 and block 1 while shifting the detection filter on a pixel-by-pixel basis from coordinates (0,0) to coordinates (8,0) (in direction d1 as shown in FIG. 9). Similarly, the embedded information determining section 703 calculates a cross-correlation while shifting the detection filter shown in FIG. 13 from coordinates (16,0) to (24,0). Note that the cross-correlation may be calculated in accordance with a known method, an equation, or the like.

Figure 14A:
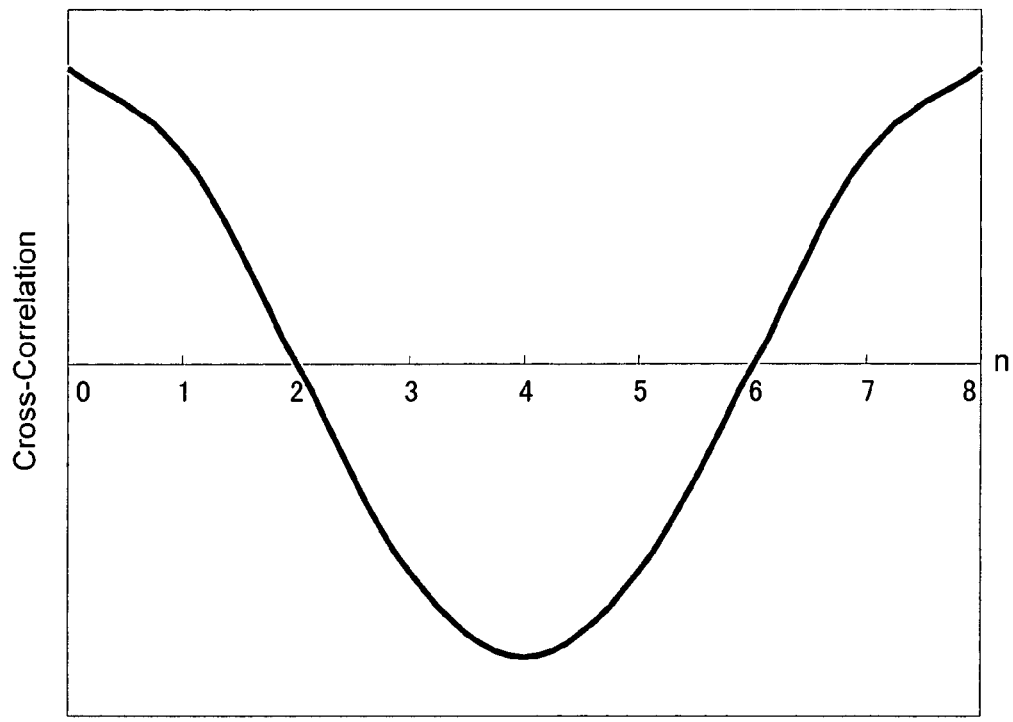
FIG. 14A is a diagram showing a cross-correlation between block 1 shown in FIG. 9 and the detection filter shown in FIG. 13.
Figure 14B:
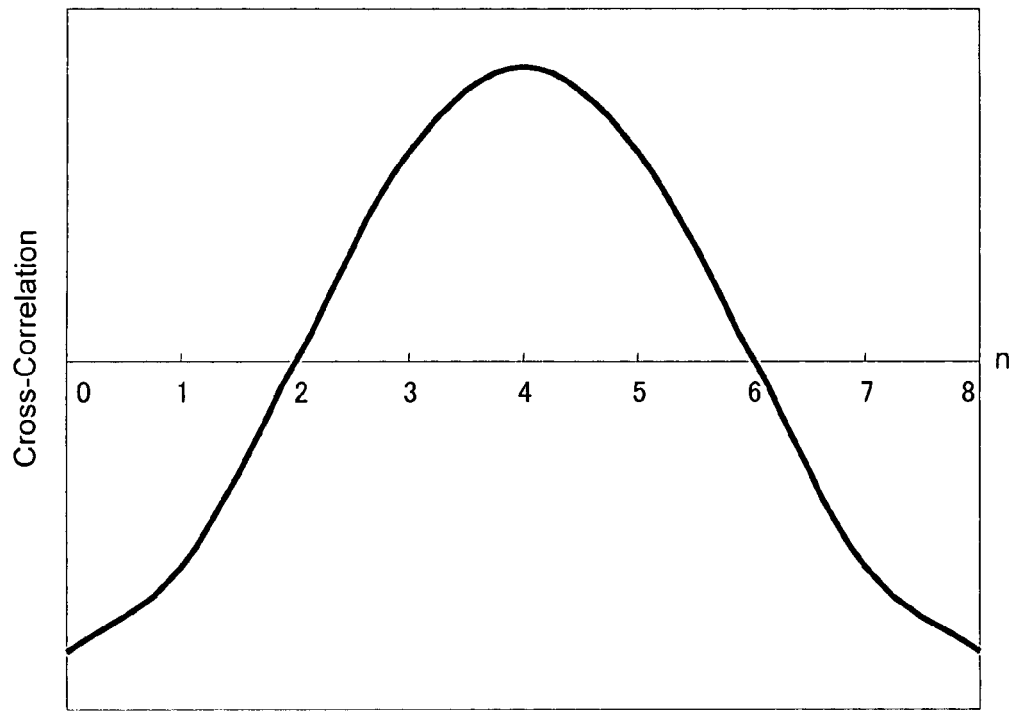
FIG. 14B is a diagram showing a cross-correlation between block 2 shown in FIG. 9 and the detection filter shown in FIG. 13.

FIG. 14A shows the cross-correlation between block 1 shown in FIG. 9 and the detection filter shown in FIG. 13, and FIG. 14B shows the cross-correlation between block 2 shown in FIG. 9 and the detection filter shown in FIG. 13. In FIG. 14A and FIG. 14B, respective vertical axes represent a value of the cross-correlation, and respective lateral axes represent a shift amount of the detection filter in directions d1 and d2.

For example, when the shift amount n of the detection filter is 0 (when coordinates of a vertex of the detection filter corresponds to coordinates (0,0)), the detection filter matches with a part of the additional pattern embedded in block 1. Therefore, as shown in FIG. 14A, the cross-correlation between the detection filter and block 1 attains a maximum value. Further, when the shift amount n of the detection filter is 4 (when the vertex of the detection filter corresponds to coordinates (4,0)), the detection filter is in a reversed relation with respect to a part of the additional pattern embedded in block 1. Therefore, as shown in FIG. 14A, the cross-correlation between the detection filter and block 1 attains a minimum value. The cross-correlation shown in FIG. 14B can be also obtained in a similar manner.

The cross-correlation between block 1 and the detection filter represents a cosine curve in the case of being plotted as shown in FIG. 14A. Since a phase of the cross-correlation shown in FIG. 14B is reversed with respect to the cross-correlation shown in FIG. 14A (that is, a phase difference therebetween equals to $\pi$), the embedded information determining section 703 determines that the additional patterns which are in opposite phase to each other are embedded in blocks 1 and 2, respectively. Therefore, the embedded information determining section 703 determines that an information signal W[1] embedded in blocks 1 and 2 is 1.

Next, the detecting method, in the case where a relative position of the additional pattern with respect to an information-containing image is misaligned in image data which is optically converted from a printed image to digital data, or an image to which clipping is applied, will be described.

Figure 10:
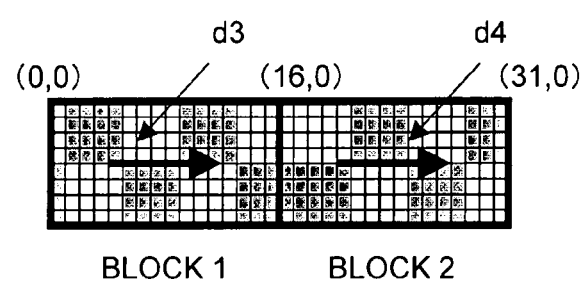
FIG. 10 is a diagram showing another example of the detecting method (a case with the positional misalignment in the additional patterns) executed by the digital watermark detecting device according to embodiment 3 of the present invention.

FIG. 10 shows two blocks 1 and 2 respectively selected from the information-containing image whose additional patterns are misaligned with respect to each other.

The embedded information determining section 703 calculates a cross-correlation between the detection filter and block 1 while shifting the vertex of the detection filter from coordinates (0,0) to (8,0) (in direction d3 as shown in FIG. 10). Further, the embedded information determining section 703 calculates a cross-correlation between the detection filter and block 2 in the case where the vertex of the detection filter is shifted form coordinates (16,0) to (24,0) (in direction d4 as shown in FIG. 10).

Figure 15A:
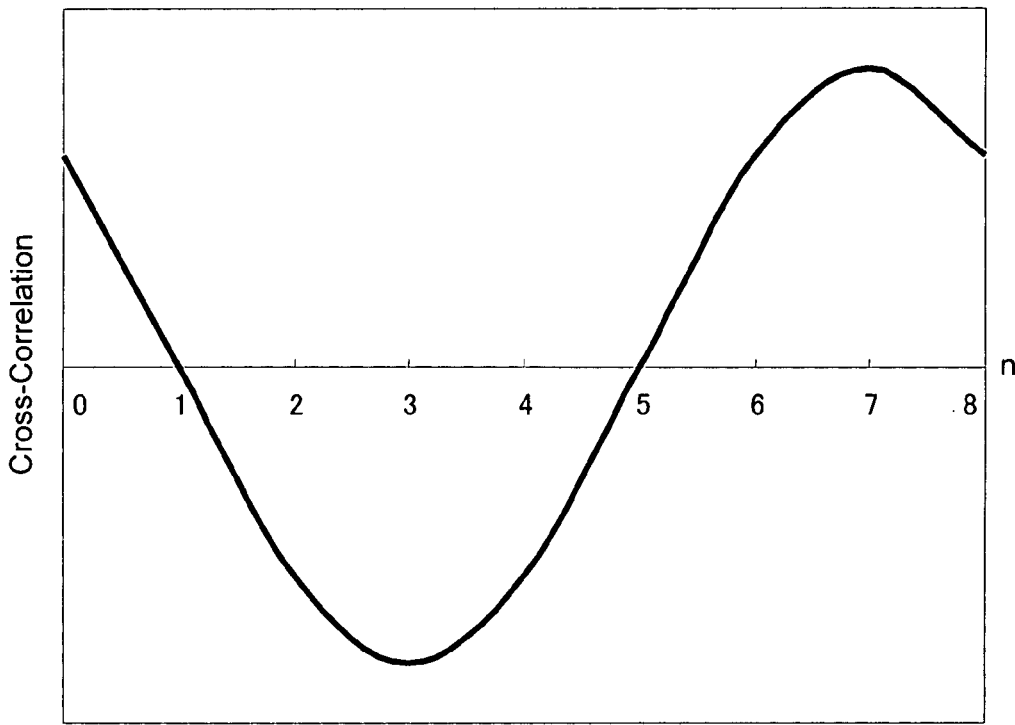
FIG. 15A is a diagram showing a cross-correlation between block 1 shown in FIG. 10 and the detection filter shown in FIG. 13.
Figure 15B:
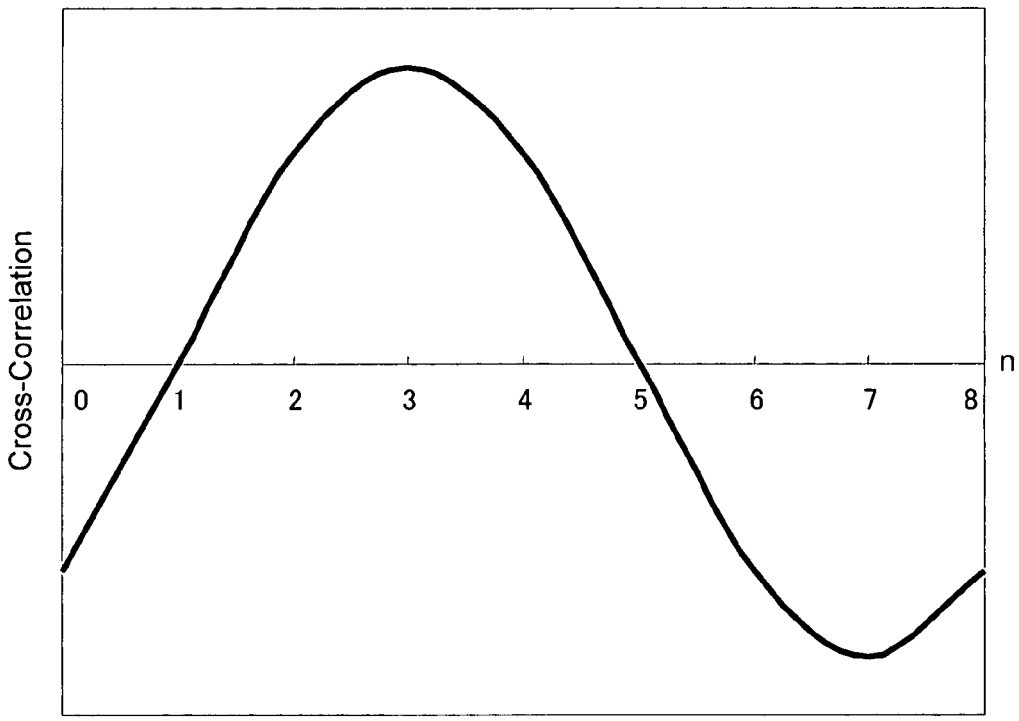
FIG. 15B is a diagram showing a cross-correlation between block 2 shown in FIG. 10 and the detection filter shown in FIG. 13.

FIG. 15A shows the cross-correlation between block 1 shown in FIG. 10 and the detection filter shown in FIG. 13, and FIG. 15B shows the cross-correlation between block 2 shown in FIG. 10 and the detection filter shown in FIG. 13. In FIGS. 15A and 15B, respective vertical axes represent a value of the cross-correlation, and respective lateral axis represent a shift amount of the detection filter in direction d3 or d4.

With respect to block 1 shown in FIG. 10, the additional pattern is misaligned by 1 pixel. Thus, an initial phase (n=0 phase) of the cross-correlation shown in FIG. 15A is misaligned by 1 shift amount with respect to an initial phase of the cross-correlation shown in FIG. 14A. An initial phase of the cross-correlation shown in FIG. 15B is also misaligned by 1 shift amount with respect to an initial phase of the cross-correlation shown in FIG. 14B.

However, when the respective cross-correlations shown in FIG. 15A and FIG. 15B are compared to each other, a phase of the cross-correlation shown in FIG. 15B is reversed with respect to a phase of the cross-correlation shown in FIG. 15A (that is, a phase difference therebetween equals to $\pi$). Accordingly, in an example shown in FIG. 10, the embedded information determining section 703 can also determine that the additional patterns, which are embedded in blocks 1 and 2, are in opposite phase to each other. Therefore, the embedded information determining section 703 can determine, based on the cross-correlation of the additional patterns embedded in blocks 1 and 2, that an information signal W[1] embedded in blocks 1 and 2 is 1.

As above described, with the digital watermark detecting device and the method according to embodiment 3, it is possible to detect the cross-correlation of each the additional patterns embedded in the plurality of the blocks, and determine, based on the detected cross-correlation, one data element W[k] constituting the embedded information signal. Therefore, even when a relative positional misalignment of the additional patterns occurs in an information-containing image which is optically converted from the printed image to the digital data, or an information-containing image to which clipping is applied, etc., it is possible to accurately detect the information signal embedded therein without depending on the positional misalignment of the additional patterns.

Further, when an image printed on paper and the like is captured with a digital camera or a camera-equipped cellular phone, distortion occurs to the captured image, in general. However, the digital watermark detecting device according to the present invention can produce an inherent effect in that, if information is embedded by the digital watermark embedding device according to the present invention, information embedded as a digital watermark can be detected without dependence on the positional misalignment of the additional patterns.

Embodiment 4

Since a constitution of a digital watermark detecting device according to embodiment 4 is the same as that of the embodiment 3, the block diagram, the flowchart, and description thereof as shown in embodiment 3 apply to the present invention. Thus, description thereof is omitted here.

Hereinafter, in the context of a specific example, details of respective steps will be described. Note that, in embodiment 3, it is assumed that 0 is embedded as information when two additional patterns are in phase with each other, and 1 is embedded as information when the two additional patterns are in opposite phase to each other.

Figure 11:
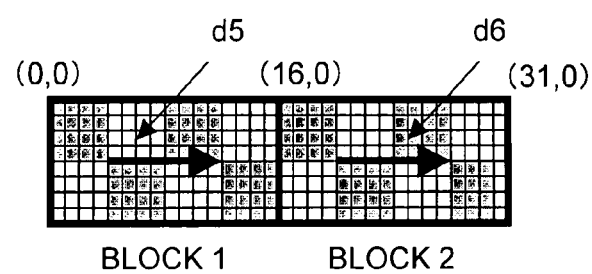
FIG. 11 is a diagram showing an example of a detecting method (a case without a positional misalignment in additional patterns) executed by a digital watermark detecting device according to embodiment 4 of the present invention.

FIG. 11 is a diagram showing an example of a detecting method executed by the digital watermark detecting device according to embodiment 4 of the present invention. FIG. 11 shows a case where there is no positional misalignment occurring to the additional patterns embedded in information-containing data.

First, the block dividing section 701 divides the information-containing data including 32×8 pixels into a plurality of blocks respectively containing 16×8 pixels (step 801).

Next, the block selecting section 702 selects blocks 1 and 2 from two blocks divided by the block dividing section 801 (step 802).

Finally, the embedded information determining section 703 detects a combination of the additional pattern embedded in blocks 1 and 2, and then determines embedded information corresponding to the detected additional pattern.

More specifically, the embedded information determining section 703 uses the pattern shown in FIG. 13 as the detection filter. The embedded information determining section 703 calculates a cross-correlation between the detection filter and block 1 while shifting a vertex of the detection filter, on a pixel-by-pixel basis, from coordinates (0,0) to coordinates (8,0) (in direction d5 as shown in FIG. 11). Further, the embedded information determining section 703 calculates a cross-correlation between the detection filter and block 2 while shifting the vertex of the detection filter from coordinates (16,0) to (24,0) on a pixel-by-pixel basis (in direction d6 as shown in FIG. 11).

Figure 16A:
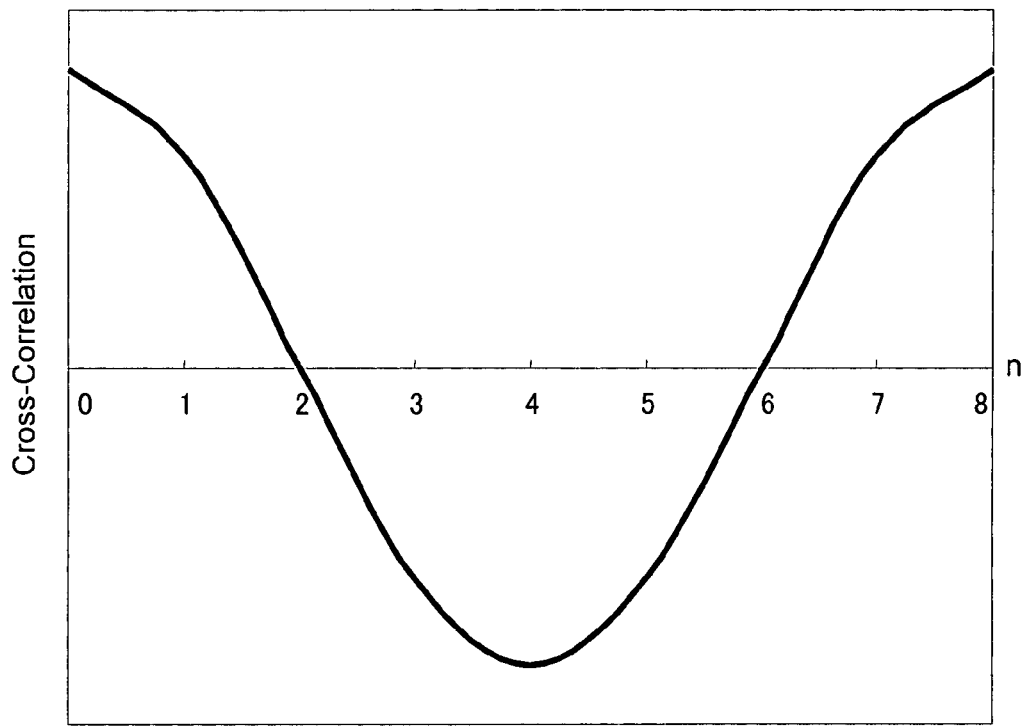
FIG. 16A is a diagram showing a cross-correlation between block 1 shown in FIG. 11 and the detection filter shown in FIG. 13.
Figure 16B:
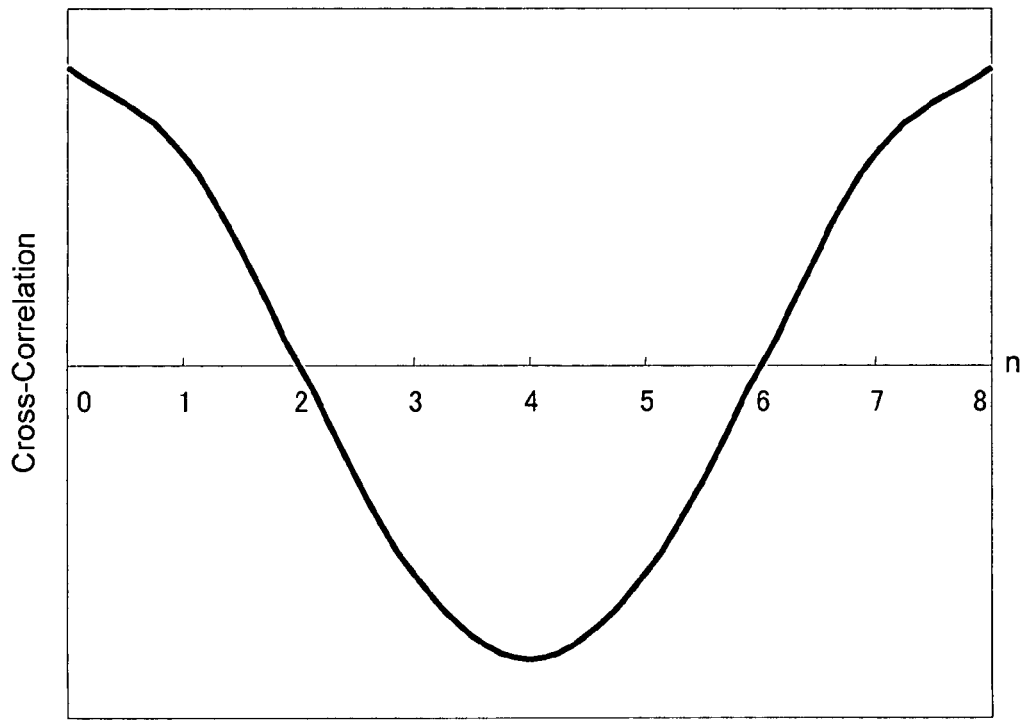
FIG. 16B is a diagram showing a cross-correlation between block 2 shown in FIG. 11 and the detection filter shown in FIG. 13.

FIG. 16A shows the cross-correlation between block 1 shown in FIG. 11 and the detection filter shown in FIG. 13, and FIG. 16B shows the cross-correlation between block 2 shown in FIG. 11 and the detection filter shown in FIG. 13. In FIGS. 16A and 16B, respective vertical axes represent a value of the cross-correlation, and respective lateral axes represents a shift amount of the detection filter in direction d5 or d6.

A phase of the cross-correlation shown in FIG. 16B is not reversed with respect to a phase of the cross-correlation shown in FIG. 16A, and thus the embedded information determining section 703 determines that additional patterns which are in phase with each other are embedded in blocks 1 and 2. Therefore, the embedded information determining section 703 determines that an information signal W[1] embedded in blocks 1 and 2 is 0.

Next, the detecting method, in the case where a relative position of the additional pattern with respect to an information-containing image is misaligned in image data which is optically converted from a printed image to digital data, and an image to which clipping is applied, will be described.

Figure 12:
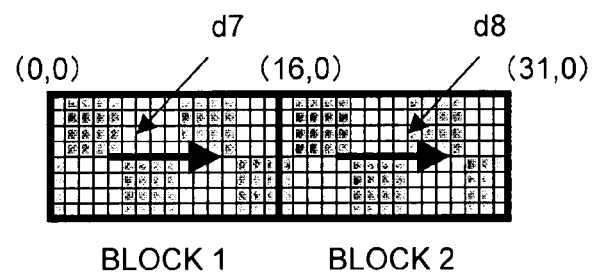
FIG. 12 is a diagram showing another example of the detecting method (a case with the positional misalignment in the additional patterns) executed by the digital watermark detecting device according to embodiment 4 of the present invention.

FIG. 12 is a diagram showing another example of the detecting method executed by the digital watermark detecting device according to embodiment 4 of the present invention. FIG. 12 shows two blocks 1 and 2 respectively selected from the information-containing image having misaligned additional patterns.

The embedded information determining section 703 calculates a cross-correlation between the detection filter and block 1 in the case where the vertex of the detection filter is shifted from the coordinates (0,0) to (8,0) (in direction d7 as shown in FIG. 12). Further, the embedded information determining section 703 calculates a cross-correlation between the detection filter and block 2 in the case where the vertex of the detection filter is shifted from the coordinates (16,0) to (24,0) (in direction d8 as shown in FIG. 12).

Figure 17A:
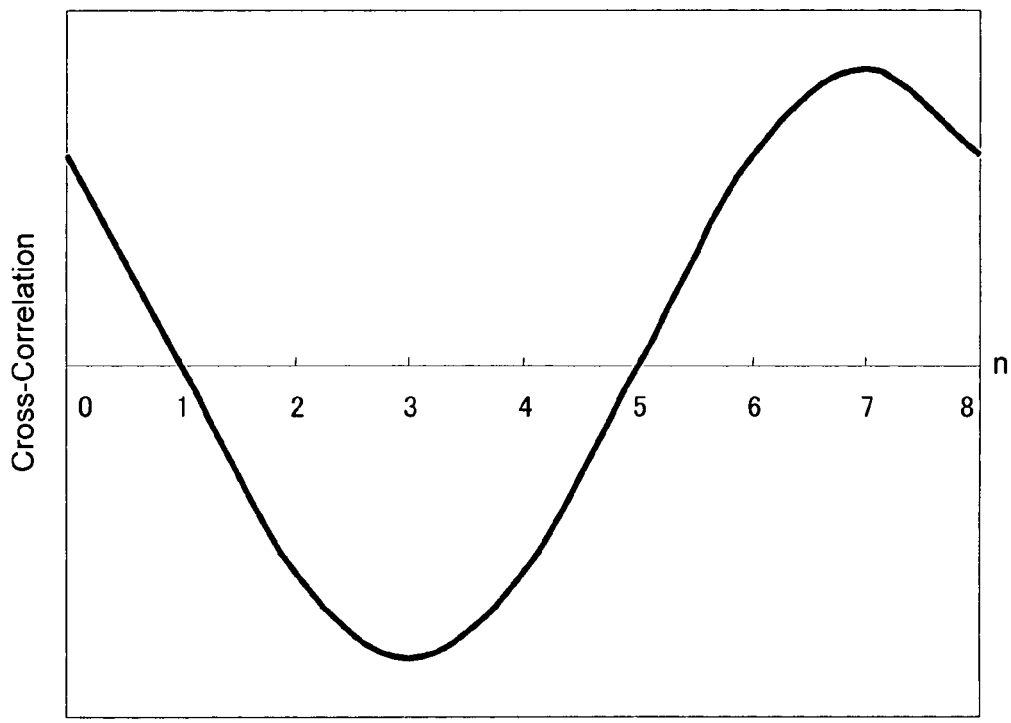
FIG. 17A is a diagram showing a cross-correlation between block 1 shown in FIG. 12 and the detection filter shown in FIG. 13.
Figure 17B:
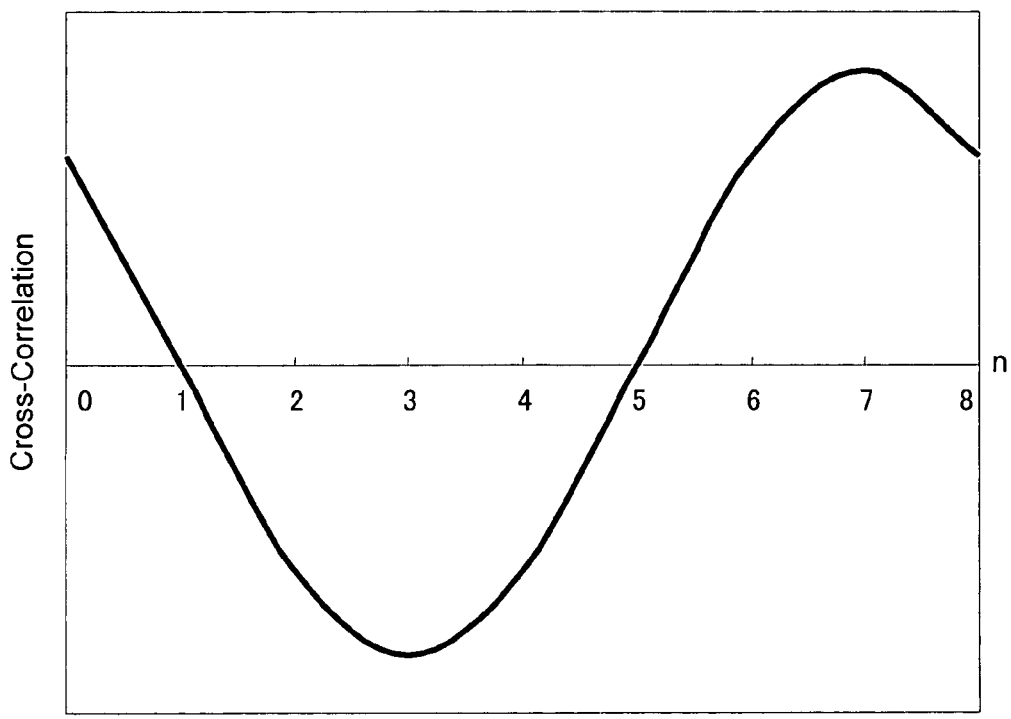
FIG. 17B is a diagram showing a cross-correlation between block 2 shown in FIG. 12 and the detection filter shown in FIG. 13.
Figure 20A:
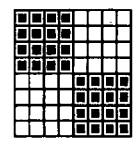
FIG. 20A is a diagram showing example 1 of the additional pattern.
Figure 20B:
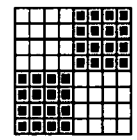
FIG. 20B is a diagram showing example 1 of the additional pattern.

FIG. 17A shows the cross-correlation between block 1 shown in FIG. 12 and the detection filter shown in FIG. 13, and FIG. 17B shows the cross-correlation between block 2 shown in FIG. 12 and the detection filter shown in FIG. 13. In FIG. 17A and FIG. 17B, respective vertical axes represent a value of the cross-correlation, and respective lateral axes represent a shift amount of the detection filter in directions d7 and d8.

With respect to block 1 shown in FIG. 11, the additional pattern is misaligned by 1 pixel. Thus, the cross-correlation shown in FIG. 17A is misaligned, in terms of an initial phase thereof, by 1 shift amount with respect to the cross-correlation shown in FIG. 16A. The cross-correlation shown in FIG. 17B is also misaligned, in terms of an initial phase thereof, by 1 shift amount with respect to the cross-correlation shown in FIG. 16B.

However, when the respective cross-correlations shown in FIG. 17A and FIG. 17B are compared to each other, a phase of the cross-correlation shown in FIG. 17B coincides with a phase of the cross-correlation shown in FIG. 17A. Therefore, in an example shown in FIG. 12, the embedded information determining section 703 can also determine that the additional patterns embedded in blocks 1 and 2 are in phase with each other. Accordingly, the embedded information determining section 703 can determine that, based on the cross-correlations of the additional patterns embedded in blocks 1 and 2, an information signal W[1] embedded in blocks 1 and 2 is 0.

As above described, with the digital watermark detecting device and the method according to embodiment 4, it is possible to detect the cross-correlation of each of the additional patterns respectively embedded in the plurality of blocks, and determine, based on the detected cross-correlation, one data element W[k] constituting the embedded information signal. Therefore, even when a relative positional misalignment of the additional patterns occurs in the information-containing image which is optically converted from the printed image to the digital data, or the information-containing image to which clipping is applied, etc., it is possible to accurately detect the information signal embedded therein without depending on the positional misalignment of the additional patterns.

In above-described embodiment 1, the digital watermark embedding device embeds the additional patterns, which are in phase with each other, into blocks 1 and 2 in the case of embedding 0 as information, and embeds the additional patterns, which are in opposite phase to each other, into blocks 1 and 2 in the case of embedding 1 as information. However, a combining method of the additional patterns is not limited to this example. The digital watermark embedding device may embed the additional patterns, which are in opposite phase to each other, into blocks 1 and 2 in the case of embedding 0 as information, and embed the additional patterns, which are in phase with each other, into blocks 1 and 2 in the case of embedding 1 as information.

Further, in above-described embodiment 2, the digital watermark embedding device embeds an additional pattern which is in phase with block 1, and an additional pattern which is in phase with block 2, into blocks 2 and 3, respectively, in the case where 0 is embedded as information; and embeds an additional pattern which is in opposite phase with block 1, and an additional pattern which is in opposite phase with block 2, into blocks 2 and 3, respectively, in the case where 1 is embedded as information. However, the combining method of the additional patterns is not limited to this example. Each of 0 and 1 information may be corresponding to each of the combination of the additional patterns, in a manner opposite to that of the above-described embodiment. Further, various variations may be considered in relation to the combining method of the additional patterns. For example, the digital watermark embedding device may embed an additional pattern which is in phase with block 1, and an additional pattern which is in opposite phase to block 2, into blocks 2 and 3, respectively, in the case where 0 is embedded as information; and embed an additional pattern which is in opposite phase to block 1, and an additional pattern which is in phase with block 2, into blocks 2 and 3, respectively, in the case where 1 information is embedded.

Further in above-described embodiments 1 and 2, when setting the combination of the additional patterns to be embedded into blocks i and j (i and j are respectively integers which satisfy i<j), the digital watermark embedding device sets the additional pattern to be embedded into block j depending on the additional pattern to be embedded into block i. However, a setting method of the additional patterns is not limited to this example. For example, the digital watermark embedding device may set the additional pattern to be embedded into block i, depending on the additional pattern to be embedded into block j.

Further, in above-described embodiments 1 and 2, the block selecting section selects two or three blocks, but the number of blocks to be selected is not limited to this example. A similar discussion may be also applied to a case where the block selecting section selects no less than four blocks.

Further, in above-described embodiment 1 and 2, the block selecting section selects no less than two neighboring blocks, however, a selecting method of the blocks is not limited to this example. For example, the block selecting section may select, in an intermittent manner, blocks which are away from each other by several blocks. Further, the block selecting section may select no less than two blocks aligning in a vertical direction or in a diagonal direction, instead of selecting no less than two blocks aligning in a horizontal direction.

Further, in above-described embodiments 1 and 2, the digital watermark embedding device directly embeds the additional patterns into the pixel values contained in the blocks, however, a embedding method of the additional patterns is not limited to this example. For example, the additional pattern embedding section may embed the additional pattern into a luminance signal, or a color-difference signal, and the like which are converted from a color space. Further, the additional pattern embedding section may embed the additional pattern by converting the pixel values of the block into a frequency domain and then controlling a frequency factor thereof, instead of embedding the additional pattern directly in a space domain.

Further, in above-described embodiment 3 and 4, the digital watermark detecting device detects the combination of the additional patterns in the space domain, but a detecting method of the additional patterns is not limited thereto. For example, the digital watermark detecting device may determine the combination of the embedded additional patterns after converting the blocks into a value of the frequency domain.

Further, in above-described embodiments 3 and 4, a detecting method of the information signal embedded in each of the two neighboring blocks is described, however, a similar discussion may be applied to a case where the information signal embedded in no less than three blocks is to be detected.

Further, in above-described embodiments 3 and 4, the detection filter which is a part of the additional pattern is used, however, the detection filter is not limited to this example. Specifically, the additional pattern and the detection filter are not necessarily in a complete subset relation, and detection of the additional pattern by using the detection filter is possible as long as a relation of "the detection filter≈a part of the additional pattern" is satisfied. For example, it is possible to use Walsh-Hadamard basis as shown in FIG. 18, and DCT (Discrete Cosine Transform) as shown in FIG. 19 for a data array of the additional pattern, and a data array of the detection filter, respectively.

Further, a size of the detection filter is not limited to 8×8. The digital watermark detecting device may perform detection processing while appropriately changing a filter size thereof in relation to a scale-up or scale-down ratio of the information-containing image. In this case, it is also possible to accurately detect the information signal embedded in the information-containing image which is scaled-up or scaled-down.

Further, in above-described embodiments 1 to 4, it is possible to accurately detect the information embedded in the scaled-up or scaled-down information-containing image by repeating a loop processing in accordance with a method as follows.

Figure 23:
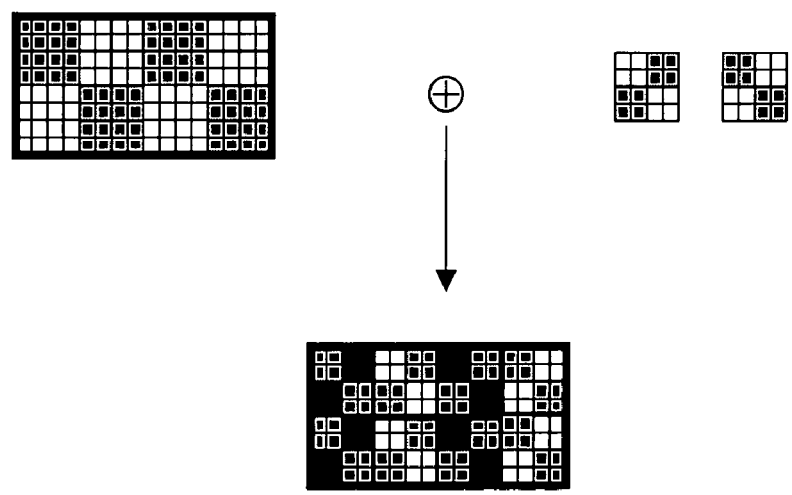
FIG. 23 is a diagram showing a modified example where several types of the additional patterns respectively having different sizes are embedded in digital data.

FIG. 23 is a diagram showing a modified example where several types of the additional patterns respectively having different sizes are embedded in digital data.

In the modified example, the digital watermark embedding device returns to step 201 after embedding the additional patterns in step 204 as shown in FIG. 2, and then executes block dividing again. At this stage in step 201, the block dividing section divides the original data into a plurality of blocks respectively having sizes which are different from those previously divided into.

For example, as shown in FIG. 23, the digital watermark embedding device divides 16×8 image data into two blocks respectively having 8×8 sizes, and after embedding an additional pattern having the 8×8 sizes on each of the blocks, again divides an image having the additional patterns embedded therein into a plurality of blocks respectively having 4×4 sizes. And then, the digital watermark embedding device further embeds additional patterns, respectively having 4×4 sizes as shown in FIG. 23, into the image data having the additional patterns of the 8×8 sizes already embedded therein.

Here, in the case where additional patterns having difference sizes are embedded in the image data several times, an additional pattern to be embedded for a p-th time and an additional pattern to be embedded for a q-th time are desirably set in an orthogonal relation with respect to each other. In this case, at the time of detection of the additional patterns, the additional pattern for the p-th time and the additional pattern for the q-th time do not affect each other.

Note that the orthogonal relation of two of the additional patterns can be easily realized with the use of the above-described Walsh-Hadamard basis and Discrete Cosine Transform basis.

In this way, if the several types of the additional patterns having the different sizes are embedded in the image data, the detection filter coincides with any of the additional patterns which are embedded in the scaled-up or the scaled-down information-containing image. Therefore, the digital watermark detecting device can determine the additional pattern embedded in the information-containing image without changing the size of the detection filter.

Further, in above-described embodiments 1 to 4, a case where digital data, which is the processing target, represents a still image is described, however, it is also possible to similarly apply the present invention to a case where the digital data represents a moving image by processing respective frames constituting the moving image as the still image. In this case, various variations may be considered as the selecting method of the blocks. For example, the block selecting section may select one block each from a plurality of flames. In this case, by calculating a time series cross-correlation at the time when the additional patterns are detected, the digital watermark detecting device can detect the combination of the additional patterns in accordance with the cross-correlation. Further, the block selecting section may select blocks respectively having different coordinates from each of the plurality of the frames.

Further, in above-described embodiments 1 to 4, patterns as shown in FIGS. 21A and 21B are described as an example of the additional patterns, however, the additional patterns are not limited to this example. As another example of the additional patterns, patterns as shown in FIGS. 20A and 20B, or FIGS. 22A and 22B may be used.

Further, the digital watermark embedding device or the digital watermark detecting device in above-described embodiments 1 to 4 can be realized by causing a computer to execute a program stored in a storage device (such as a ROM, a RAM, and a hard disc) after installation or causing the computer to execute the program via a network. In the program, the block dividing section 101, the block selecting section 102, the additional pattern setting section 103, the additional pattern embedding section 104, the block dividing section 701, the block selecting section 702, and the embedded information determining section 703 are included as process or program modules. The computer corresponds to a notion including a computer incorporated in a portable terminal device. Here, a storage medium may be referred to as a recoding medium including a ROM, a RAM, a semiconductor memory such as a flash memory, etc., a magnetic disc memory such as a flexible disc and a hard disc, etc., an optical disc such as a CD-ROM, a DVD, and a BD, etc., and a memory card, etc. Further the recording medium is a notion including a communication medium such as a telephone line and a carrier line, etc.

Figure 24:
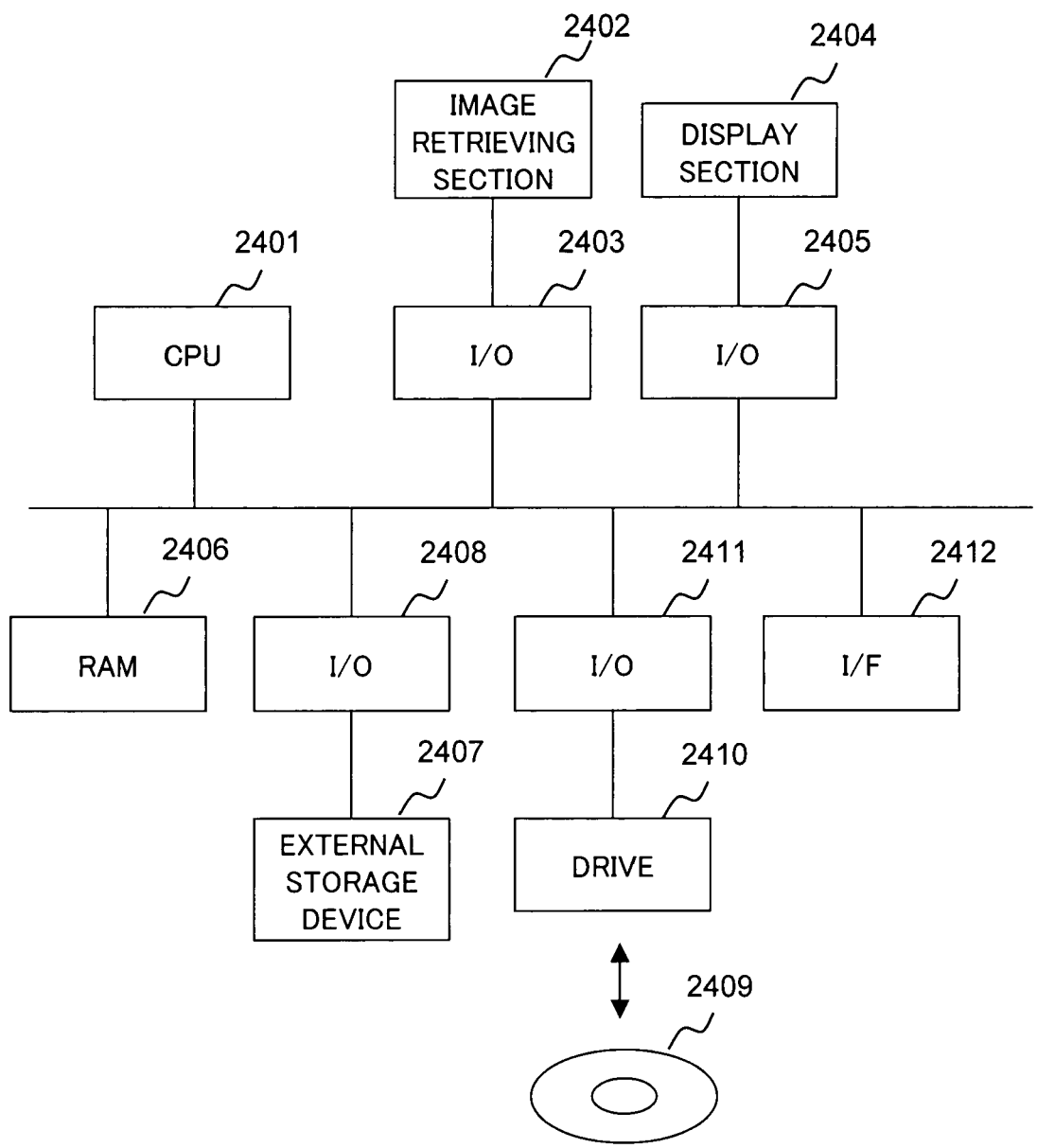
FIG. 24 is a diagram showing a schematic constitution of computer hardware which executes a digital watermark embedding or a detecting program stored on a recording medium.

FIG. 24 is a diagram showing a schematic constitution of a computer hardware which executes a digital watermark embedding or a detecting program stored on the recording medium. The computer shown in FIG. 24 comprises a CPU 2401, an image retrieving section 2402, a display section 2404 such as a digital camera, a camcorder, a camera-equipped cellular phone, etc., a RAM 2406, an external storage device 2407 such as a hard disc, etc., a drive 2410 which reads a recording medium 2409 such as a CD-ROM and a DVD-ROM, etc., and a network I/F (interface) 2412 for performing network communication.

As an example, the image retrieving section 2402 may be an external storage device such as the hard disc, in the case of causing the CPU 2401 to execute a digital watermark embedding processing, and may be optical device such as the digital camera, the camcorder, the camera-equipped cellular phone, and a scanner, other than the external storage device such as the hard disk, in the case of causing the CPU 2401 to execute a digital watermark detecting processing. The image retrieving section 2402 is connected to a data bus via connection I/O (input/output). Further the display section 2404, the external storage device 2407, and the drive 2410 are respectively connected to the data bus via connection I/O (input/output) 2405, connection I/O 2408, and connection I/O 2411.

Figure 25:
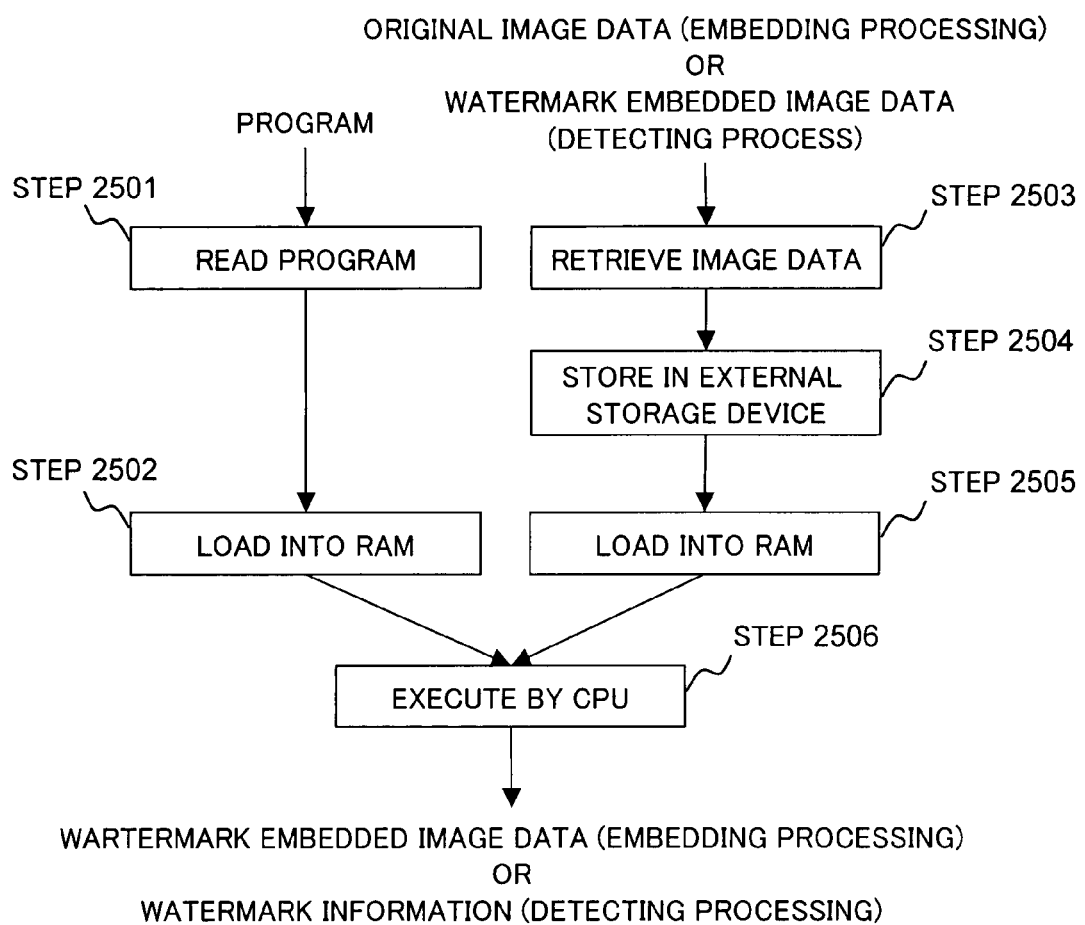
FIG. 25 is a flowchart showing a method for realizing the digital watermark embedding device or the detecting device with the computer shown in FIG. 24.
Figure 26:
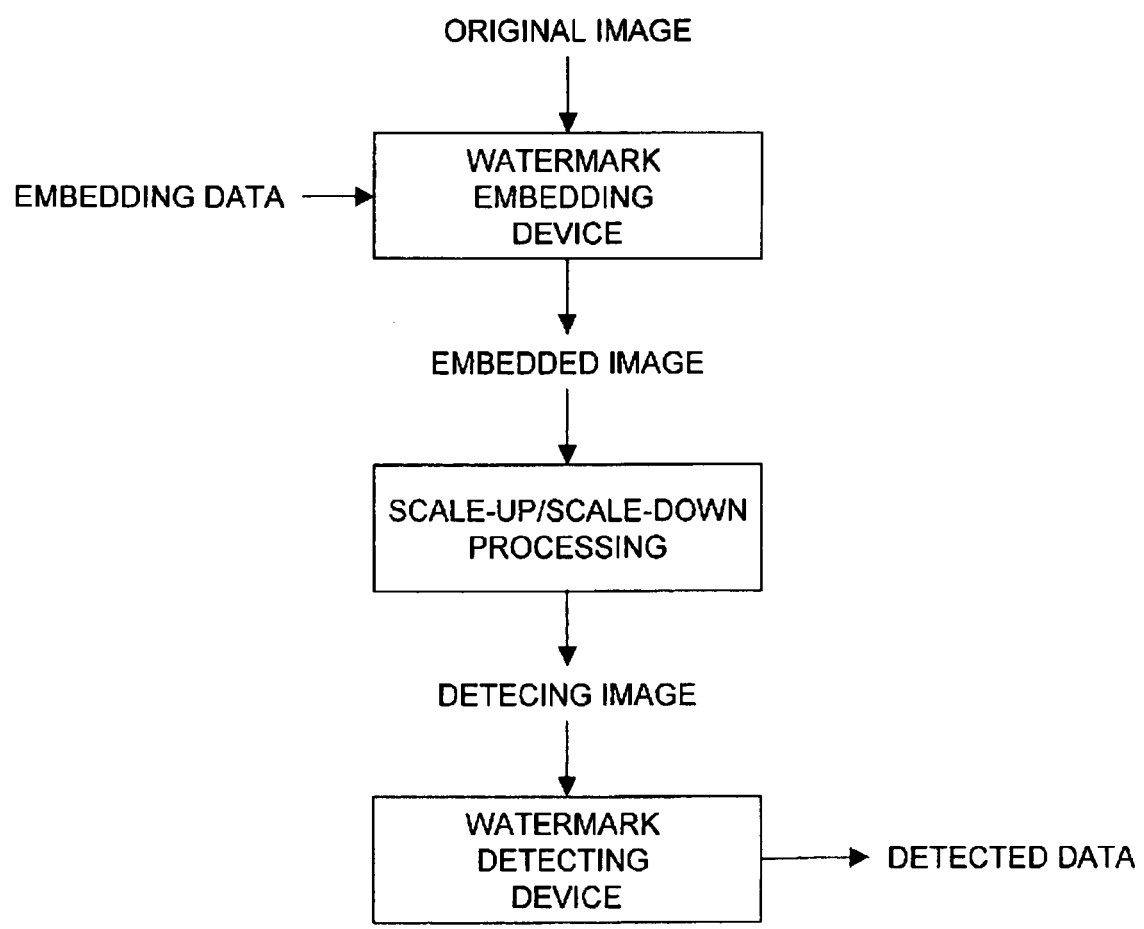
FIG. 26 is a block diagram showing conventional digital watermark embedding and detecting techniques.
Figure 27A:
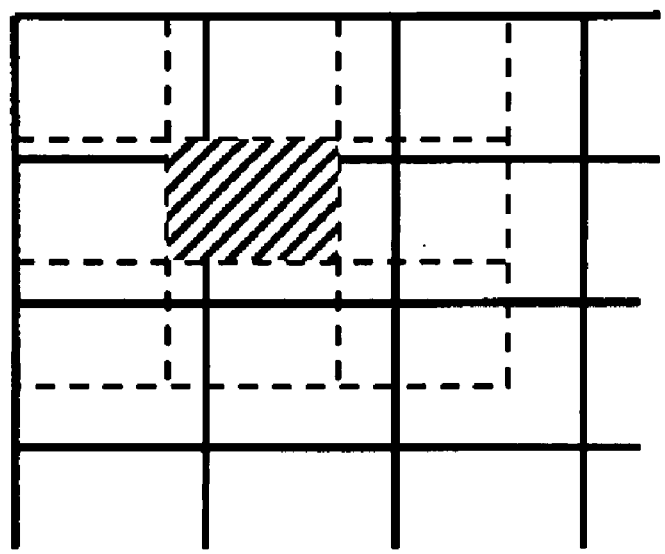
FIG. 27A is a schematic diagram showing a conventional scale-up/scale-down processing, more specifically, is a diagram showing a case where an autocorrelation does not have a peak.
Figure 27B:
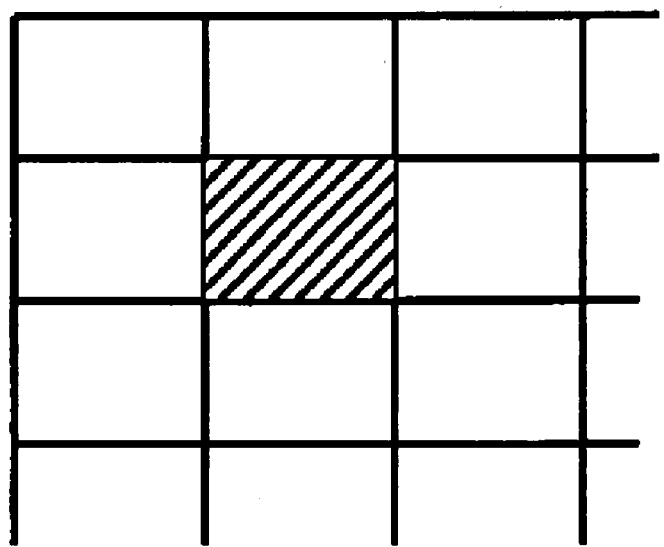
FIG. 27B is a schematic diagram showing a conventional scale-up/scale-down processing, more specifically, is a diagram showing a case where the autocorrelation has a peak.

FIG. 25 is a flowchart showing a method for realizing the digital watermark embedding device or the detecting device with the computer shown in FIG. 24.

First, the computer reads a program (step 2501). The program for causing the CPU 2401 to execute the digital watermark embedding method or detecting method is recorded in the recording medium 2409 in a format readable and executable by the computer. The program recorded in the recording medium 2409 is read out in the drive 2410. Alternatively, the program may be downloaded from an external storage device through the network I/F 2412. Further, the program may be previously stored in the external storage device 2407, or may be stored in the external storage device 2407 through the connection I/O 2411 and 2408 after being read out from the drive 2410. Further, the program may be stored in the external storage device 2407 via the connection I/O 2408 after being downloaded via the network I/F 2412.

Next, the program is read out to the RAM 2406 (step 2502). In the case where the program is loaded from the drive 2410 into the RAM 2406, the program may be stored in the RAM 2406 via the connection I/O 2411. On the other hand, in the case where the program, which is once stored in the external storage device 2407, is read out to the RAM 2406, the program is stored in the RAM 2406 via the connection I/O 2408.

Next, image data is inputted (step 2503). In the case the CPU 2401 executes the digital watermark embedding processing, original image data is retrieved from the image retrieving section 2402. Further, in the case where the CPU 2401 executes the digital watermark detecting processing, the image data having a digital watermark embedded therein is retrieved from the image retrieving section 2402. The image having the digital watermark embedded therein may be captured optically with the optical device such as digital camera, as above described. The captured image data is stored in the external storage device 2407 via the connection I/O 2403 and 2408.

Next, the retrieved image data is stored in the RAM 2406 through the connection I/O 2408 (step 2505).

Next, the CPU 2401 executes the digital watermark embedding processing or the detecting processing with the use of the program and the image stored in the RAM 2406 (step 2506). Since a processing procedure executed by the CPU 2401 is already described in each of the above-described embodiments, the description thereof is omitted here.

After that, a processing result by the CPU 2401 is outputted to the display section 2404 via the connection I/O 2405. Further the processing result may be outputted to an output device or a storage device on the network via the network I/F 2412.

As above described, the computer executes the program recorded in the recording medium, thereby realizing the digital watermark embedding device or the digital watermark detecting device according to each of the above-described embodiments.

Further, functional blocks (FIG. 1) of the digital watermark embedding device or functional blocks (FIG. 7) of the digital watermark detecting device according to each of the above-described embodiments may be realized as an LSI, which corresponds to an integrated circuit. These functional blocks may be constructed in a chip form, or may be constructed in a chip form so as to include a part or all of the same. LSI, which is herein referred to as LSI, may be an IC, a system LSI, a super LSI, and an ultra LSI depending on the degree of integration. Further, a method of integration is not limited to the LSI, and the integration may be realized by a dedicated circuit or a general-purpose processor. Further, an FPGA (Field Programmable Gage Array), which is an LSI that can be programmed after manufacture, or a reconfigurable processor enabling connections and settings of the circuit cells in the LSI to be reconfigured may be used. Further, in the case where another integration technology replacing the LSI becomes available due to improvement of a semiconductor technology or due to emergence of another technology derived therefrom, integration of the functional blocks may be performed using the integration technology. For example, biotechnology may be applied to the above-described integration.

INDUSTRIAL APPLICABILITY

The present invention can realize a digital watermark whose tolerance against a positional misalignment is improved, and is thus useful for a case, for example, where printing or clipping processing may causes a relative positional misalignment to an embedded digital watermark.

The invention claimed is:

1. A digital watermark embedding device for embedding information including at least one value into digital data as a digital watermark, the digital watermark embedding device comprising:
    a block dividing section for dividing the digital data into a plurality of blocks each having a predetermined size;
    a block selecting section for selecting m blocks (m is an integer no less than 2) from the plurality of the blocks in accordance with a predetermined order;
    an additional pattern setting section for setting a combination of m additional patterns selected from a plurality of types of additional patterns, the combination of the m additional patterns representing one value to be embedded into the selected m blocks; and
    an additional pattern embedding section for embedding each of the set m additional patterns into each of the selected m blocks.

2. The digital watermark embedding device according to claim 1, wherein the additional pattern setting section sets, depending on an additional pattern to be embedded into one of the selected m blocks, the additional pattern to be embedded into another one of the selected m blocks.

3. The digital watermark embedding device according to claim 1, wherein
    the digital data includes a plurality of pixel values,
    an additional pattern is an array of data to be embedded into each of the pixel values, and the additional pattern setting section sets a combination of two types of the additional patterns which are reversed from each other in terms of a relative magnitude relation of data contained in each of the additional patterns.

4. The digital watermark embedding device according to claim 2, wherein
    the digital data contains a plurality of pixel values,
    an additional pattern is an array of data array to be embedded into each of the pixel values, and
    the additional pattern setting section sets a combination of two types of the additional patterns which are reversed from each other in terms of a relative magnitude relation of data contained in each of the additional patterns.

5. A digital watermark detecting device for detecting information embedded in digital data as a digital watermark, the digital watermark detecting device comprising:
    a block dividing section for dividing the digital data into a plurality of blocks each having a predetermined size;

a block selecting section for selecting m blocks (m is an integer no less than 2) from the plurality of the blocks, in accordance with a predetermined order; and an embedded information determining section for detecting a combination of m additional patterns embedded in the selected m blocks, and determining one value represented by the combination of the m additional patterns.

6. The digital watermark detecting device according to claim 5, wherein the embedded information determining section calculates a cross-correlation between a predetermined detection filter and each of the selected m blocks, and detects the combination of the m additional patterns in accordance with a phase change in the calculated cross-correlation.

7. The digital watermark detecting device according to claim 6, wherein the detection filter is constituted of at least a part of one of the m additional patterns.

8. A digital watermark embedding method for embedding information including at least one value into digital data as a digital watermark, the digital watermark embedding method comprising:

a block dividing step of dividing the digital data into a plurality of blocks each having a predetermined size;

a block selecting step of selecting m blocks (m is an integer no less than 2) from the plurality of the blocks in accordance with a predetermined order, an additional pattern setting step of setting a combination of m additional patterns selected from a plurality of types of additional patterns, the combination of the m additional patterns representing one value to be embedded into the selected m blocks; and an additional pattern embedding step of embedding each of the set m additional patterns into each of the m selected blocks.

9. A digital watermark detecting method for detecting information embedded in digital data as a digital watermark, the digital watermark detecting method comprising:

a block dividing step of dividing the digital data into a plurality of blocks each having a predetermined size;

a block selecting step of selecting m blocks (m is an integer no less than 2) from the plurality of the blocks, in accordance with a predetermined order; and an embedded information determining step of detecting a combination of m additional patterns which are embedded in the selected m blocks, and determining one value represented by the combination of the m additional patterns.

10. A non-transitory computer readable recording medium storing thereon a program for embedding information including at least one value into digital data as a digital watermark, wherein the program causes a computer to perform a method comprising:

a block dividing function of dividing the digital data into a plurality of blocks each having a predetermined size;

a block selecting function of selecting, from the plurality of the blocks, m blocks (m is an integer no less than 2) in accordance with a predetermined order;

an additional pattern setting function of setting a combination of m additional patterns selected from a plurality types of additional patterns, the combination of the m additional patterns representing one value to be embedded into the selected m blocks; and an additional pattern embedding function of embedding each of the set m additional patterns into each of the selected m blocks.

11. A non-transitory computer readable recording medium storing thereon a program for detecting information embedded in digital data as a digital watermark, wherein the program causes a computer to perform a method comprising:

a block dividing function of dividing the digital data into a plurality of blocks each having a predetermined size;

a block selecting function of selecting m blocks (m is an integer no less than 2) from the plurality of the blocks, in accordance with a predetermined order; and an embedded information determining function of detecting a combination of m additional patterns which are embedded in the m selected blocks, and determining one value represented by the combination of the m additional patterns.

* * * * *